United States Patent
Okawa

(10) Patent No.: US 10,497,142 B2
(45) Date of Patent: *Dec. 3, 2019

(54) SHAPE MEASURING DEVICE

(71) Applicant: Keyence Corporation, Osaka (JP)

(72) Inventor: Yohei Okawa, Osaka (JP)

(73) Assignee: Keyence Corporation, Osaka (JP)

( * ) Notice: Subject to any disclaimer, the term of this patent is extended or adjusted under 35 U.S.C. 154(b) by 91 days.

This patent is subject to a terminal disclaimer.

(21) Appl. No.: 15/696,229

(22) Filed: Sep. 6, 2017

(65) Prior Publication Data

US 2018/0101963 A1 Apr. 12, 2018

(30) Foreign Application Priority Data

Oct. 12, 2016 (JP) ................................. 2016-201049

(51) Int. Cl.
 *G06T 7/60* (2017.01)
 *G01B 9/02* (2006.01)
 *G01B 11/24* (2006.01)
 *H04N 5/225* (2006.01)

(52) U.S. Cl.
 CPC .............. *G06T 7/60* (2013.01); *G01B 9/0203* (2013.01); *G01B 9/0209* (2013.01); *G01B 9/02041* (2013.01); *G01B 9/02087* (2013.01); *G01B 11/24* (2013.01); *G01B 11/2441* (2013.01); *H04N 5/2256* (2013.01); *G01B 2290/35* (2013.01); *G06T 2207/10141* (2013.01)

(58) Field of Classification Search
 CPC ..... G06T 7/60; G01B 9/02041; H04N 5/2256

USPC ......................................................... 348/135
See application file for complete search history.

(56) References Cited

U.S. PATENT DOCUMENTS

2005/0122577 A1* 6/2005 Fujimoto ................. G01B 9/04
 359/383
2016/0131474 A1* 5/2016 Saeki .................. G01B 9/0205
 356/511

FOREIGN PATENT DOCUMENTS

JP 2013-083649 5/2013

OTHER PUBLICATIONS

U.S. Appl. No. 15/696,199, filed Sep. 6, 2017 (86 pages).

* cited by examiner

*Primary Examiner* — On S Mung
(74) *Attorney, Agent, or Firm* — Kilyk & Bowersox, P.L.L.C.

(57) ABSTRACT

To provide a shape measuring device capable of quickly and accurately acquiring a measurement value of a desired part of a measuring object. A specifying section 32 sets, on the basis of a relative positional relation between the first region in the measurement luminance image and a second region in the reference luminance image, a measurement target region corresponding to the reference target region in the measurement height image. A calculating section 33 calculates, on the basis of measurement height image data, a measurement value concerning height of the measuring object in the measurement target region.

8 Claims, 24 Drawing Sheets

OPTICAL PATH LENGTH DIFFERENCE

OPTICAL PATH LENGTH DIFFERENCE

FIG. 5B  HEIGHT IMAGE

FIG. 5C  LUMINANCE IMAGE

SHAPE MEASURING DEVICE

CROSS-REFERENCE TO RELATED APPLICATIONS

The present application claims foreign priority based on Japanese Patent Application No. 2016-201049, filed Oct. 12, 2016, the contents of which is incorporated herein by reference.

BACKGROUND OF THE INVENTION

1. Field of the Invention

The present invention relates to a shape measuring device that measures a surface shape of a measuring object.

2. Description of Related Art

A shape measuring device of an interference type is used in order to measure a surface shape of a measuring object.

In a coherence scanning interferometer described in JP-A-2013-83649, light generated from a light source is divided into measurement light irradiated on an object and reference light irradiated on a reference mirror. The measurement light reflected by the object and the reference light reflected by the reference mirror are superimposed and detected by a camera. In a state in which an optical system including the light source and the camera is moved relatively to the object, an image is acquired by the camera. A surface height of the object is calculated on the basis of an interval of interference fringes in the acquired image.

SUMMARY OF THE INVENTION

It is conceivable to use the shape measuring device in an inspection process in a production line of a factor or the like. For such in-lining, it is desired to quickly and accurately acquire a measurement value of a desired part of a measuring object.

An object of the present invention is to provide a shape measuring device capable of quickly and accurately acquiring a measurement value of a desired part of a measuring object.

(1) A shape measuring device according to the present invention is a shape measuring device that measures a surface shape of a measuring object, the shape measuring device including: a light projecting section configured to emit light having a plurality of peak wavelengths; a reference body; alight receiving section including a two-dimensionally arrayed plurality of pixels; an optical system configured to guide the light emitted by the light projecting section to the measuring object as measurement light, guide the light emitted by the light projecting section to the reference body as reference light, generate interference light of the measurement light reflected by the measuring object and the reference light reflected by the reference body, and guide the generated interference light to the light receiving section; a movable section to which at least one of the optical system and the reference body is attached, the movable section reciprocatingly moving to thereby change a difference between an optical path length of the measurement light and an optical path length of the reference light; a supporting section configured to support the movable section to be capable of reciprocatingly moving; a position detecting section configured to detect relative positions of the movable section with respect to the supporting section; a height-image generating section configured to generate, on the basis of the relative positions detected by the position detecting section and light receiving amounts of the plurality of pixels of the light receiving section, measurement height image data including height information of a first region of the measuring object, which corresponds to the plurality of pixels, and representing a height image of the first region as a measurement height image; a luminance-image generating section configured to generate measurement luminance image data representing a luminance image of the first region of the measuring object as a measurement luminance image; a storing section configured to store, in advance, reference luminance image data representing a luminance image of a second region of a reference object corresponding to the measuring object as a reference luminance image; a setting section configured to set a reference target region in the reference luminance image; a specifying section configured to specify, on the basis of a relative positional relation between the first region in the measurement luminance image and the second region in the reference luminance image, a measurement target region corresponding to the reference target region on the measurement height image; and a calculating section configured to calculate, on the basis of measurement height image data, a measurement value concerning height of the measuring object in the measurement target region.

In the shape measuring device, the movable section reciprocatingly moves, whereby a difference between the optical path length of the measurement light and the optical path length of the reference light (hereinafter referred to as optical path length difference) changes. An interference pattern of the light receiving amount that changes according to the optical path length difference is acquired from each of the plurality of pixels of the light receiving section. Since the measurement light and the reference light have pluralities of peak wavelengths, the interference pattern of the light receiving amount does not show spatial periodicity. Therefore, the height information of the first region of the measuring object corresponding to the plurality of pixels of the light receiving section is calculated on the basis of the relative positions of the movable section with respect to the supporting section detected by the position detecting section and the light receiving amounts of the pixels of the first light receiving section. In this case, since the plurality of pixels of the light receiving section are two-dimensionally arrayed, it is possible to simultaneously acquire the height information of the first region in two dimensions. Therefore, it is possible to generate, at high speed, measurement height image data representing the height image of the first region as the measurement height image.

The measurement luminance image data representing the luminance image of the first region of the measuring object as the measurement luminance image is generated. The reference luminance image data representing the luminance image of the second region of the reference object, which corresponds to the measuring object, as the reference luminance image is stored in advance. The reference target region is set in the reference luminance image. The measurement target region corresponding to the reference target region is specified on the measurement height image.

When the first region of the measuring object does not have a characteristic height distribution, it is difficult to directly specify the measurement target region on the measurement height image. Therefore, the measurement target region in the measurement height image is specified on the basis of the relative positional relation between the first region in the measurement luminance image and the second region in the reference luminance image. In this case, even if the first region of the measuring object does not have a characteristic height distribution, it is possible to appropriately specify the measurement target region on the measurement height image on the basis of a luminance distribution in the first region. Consequently, it is possible to quickly and accurately acquire a measurement value of a desired part of the measuring object.

(2) The luminance-image generating section may generate the measurement luminance image data on the basis of the light receiving amounts of the plurality of pixels of the light receiving section. In this case, it is possible to generate the measurement luminance image data without complicating a configuration.

(3) The shape measuring device may further include: a range setting section configured to set an allowable range of the measurement value; and a determining section configured to determine whether the measurement value calculated by the calculating section is within the allowable range set by the range setting section.

In this case, it is possible to quickly and accurately determine whether the measurement value is within the allowable range. Therefore, it is possible to effectively use the shape measuring device in an inspection process in a production line of a factory or the like.

(4) The storing section may further store reference height image data including height information of the second region of the reference object and representing a height image of the second region as a reference height image. The specifying section may select one relation of a relative positional relation between the first region in the measurement luminance image and the second region in the reference luminance image and a relative positional relation between the first region in the measurement height image and the second region in the reference height image and specify the measurement target region on the measurement height image on the basis of the selected relation.

In this case, when the first region of the measuring object has a characteristic height distribution, it is possible to easily specify the measurement target region in the measurement height image on the basis of the relative positional relation between the first region in the measurement height image and the second region in the reference height image. On the other hand, when the first region of the measuring object has a characteristic luminance distribution, it is possible to easily specify the measurement target region in the measurement height image on the basis of the relative positional relation between the first region in the measurement luminance image and the second region in the reference luminance image.

(5) The shape measuring device may further include: a region designating section configured to set a search height region in the reference height image and set a search luminance region in the reference luminance image; a first detecting section configured to detect a corresponding height region corresponding to the search height region from the measurement height image; and a second detecting section configured to detect a corresponding luminance region corresponding to the search luminance region from the measurement luminance image. The specifying section may generate first correction information representing a relative positional relation between the search height region in the reference height image and the corresponding height region in the measurement height image, generate second correction information representing a relative positional relation between the search luminance region in the reference luminance image and the corresponding luminance region in the measurement luminance image, select one correction information of the generated first and second correction information, and specify the measurement target region in the measurement height image on the basis of the selected correction information.

In this case, it is possible to appropriately specify the measurement target region in the measurement height image by selectively using the first and second correction information according to a height distribution and a luminance distribution of the first region of the measuring object.

(6) The shape measuring device may further include a measurement-condition receiving section configured to receive setting of a measurement condition in the measurement target region. The calculating section may calculate the measurement value on the basis of the measurement condition set by a condition setting section. In this case, it is possible to efficiently acquire a measurement value of a desired part of the measuring object.

(7) The shape measuring device may further include a generation-condition receiving section configured to receive setting of a generation condition of the measurement height image data. The height-image generating section may generate the measurement height image data on the basis of the generation condition set by a generation-condition setting section. In this case, it is possible to appropriately calculate the measurement value by adjusting the generation condition of the measurement height image data according to the measuring object.

According to the present invention, it is possible to quickly and accurately acquire a measurement value of a desired part of the measuring object.

BRIEF DESCRIPTION OF THE DRAWINGS

FIGS. 5A to 5C are diagrams for explaining a height image and a luminance image.

DESCRIPTION OF EMBODIMENTS

A shape measuring device according to an embodiment of the present invention is explained in detail below with reference to the drawings.

(1) Basic Configuration of a Shape Measuring Device

Figure 1:
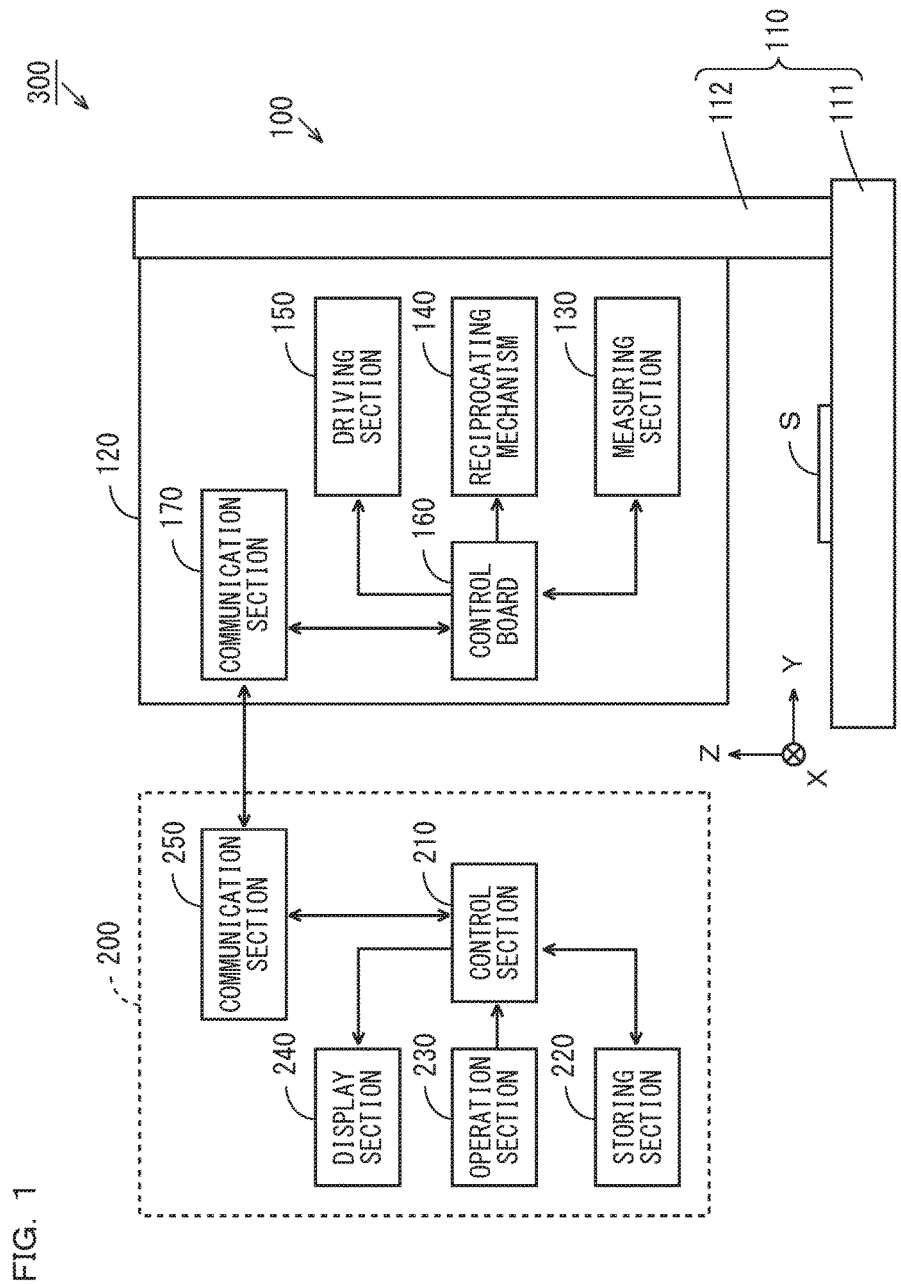
FIG. 1 is a block diagram showing the configuration of a shape measuring device according to an embodiment of the present invention.

FIG. 1 is a block diagram showing the configuration of a shape measuring device according to an embodiment of the present invention. As shown in FIG. 1, a shape measuring device 300 includes a measurement head 100 and a processing device 200. The measurement head 100 is, for example, an optical displacement gauge and includes a supporting structure 110, a housing unit 120, a measuring unit 130, a reciprocating mechanism 140, a driving unit 150, a control board 160, and a communication unit 170.

The supporting structure 110 has an L shape in longitudinal section and includes a setting section 111 and a holding section 112. The setting section 111 and the holding section 112 are formed of, for example, metal. The setting section 111 has a horizontal flat shape and is set on a setting surface. A measuring object S is placed on the upper surface of the setting section 111. In this example, an X axis and a Y axis parallel to the upper surface of the setting section 111 and orthogonal to each other are defined. A Z axis perpendicular to the upper surface of the setting section 111 is defined. In FIG. 1, arrows representing directions of the X axis, the Y axis, and the Z axis are shown.

The holding section 112 is provided to extend upward from one end portion of the setting section 111. The housing unit 120 is held by the holding section 112 of the supporting structure 110. The housing unit 120 has a rectangular parallelepiped shape and houses the measuring unit 130, the reciprocating mechanism 140, the driving unit 150, the control board 160, and the communication unit 170.

The measuring unit 130 includes a light projecting section, a light receiving section, and optical elements such as a lens and a mirror. The measuring unit 130 excluding a part of elements such as a mirror 11 shown in FIG. 2 explained below is attached to the reciprocating mechanism 140. The reciprocating mechanism 140 is reciprocatingly moved (vibrated) by the driving unit 150 in one direction with respect to a supporting section 125 shown in FIG. 2 explained below. The driving unit 150 is an actuator and, in this example, a voice coil motor.

The control board 160 acquires measurement data explained below from the measuring unit 130 and generates pixel data and generates image data on the basis of the acquired measurement data. The image data is a set of a plurality of pixel data. The control board 160 gives the generated image data to the processing device 200 and controls the operations of the measuring unit 130, the reciprocating mechanism 140, and the driving unit 150 on the basis of commands by the processing device 200.

The communication unit 170 includes a communication interface. The same applies to a communication unit 250 of the processing device 200 explained below. The communication unit 170 performs transmission and reception of various data and commands between the measurement head 100 and the processing device 200 through the communication unit 250. Details of the measurement head 100 are explained below.

The processing device 200 includes a control unit 210, a storing unit 220, an operation unit 230, a display unit 240, and a communication unit 250. The control unit 210 includes, for example, a CPU (Central Processing Unit). The storing unit 220 includes, for example, a ROM (Read Only Memory), a RAM (Random Access Memory), and a HDD (Hard Disk Drive). A system program is stored in the storing unit 220. The storing unit 220 is used for storage of various data and processing of the data.

The control unit 210 gives, on the basis of the system program stored in the storing unit 220, commands for controlling the operations of the measuring unit 130, the reciprocating mechanism 140, and the driving unit 150 of the measurement head 100 to the control board 160. The control unit 210 acquires image data from the control board 160 and causes the storing unit 220 to store the image data. Further, the control unit 210 performs, for example, measurement of a portion designated by a user on an image based on the image data.

The operation unit 230 includes a pointing device such as a mouse, a touch panel, a trackball, or a joystick and a keyboard. The operation unit 230 is operated by the user in order to give an instruction to the control unit 210. The display unit 240 includes, for example, an LCD (Liquid Crystal Display) panel or an organic EL (Electro Luminescence) panel. The display unit 240 displays an image based on image data stored in the storing unit 220, a measurement result, and the like. The communication unit 250 performs communication with the measurement head 100 as explained above. The communication unit 250 can perform communication with an external device such as a PLC (programmable logic controller).

(2) Configuration of the Measuring Unit

Figure 2:
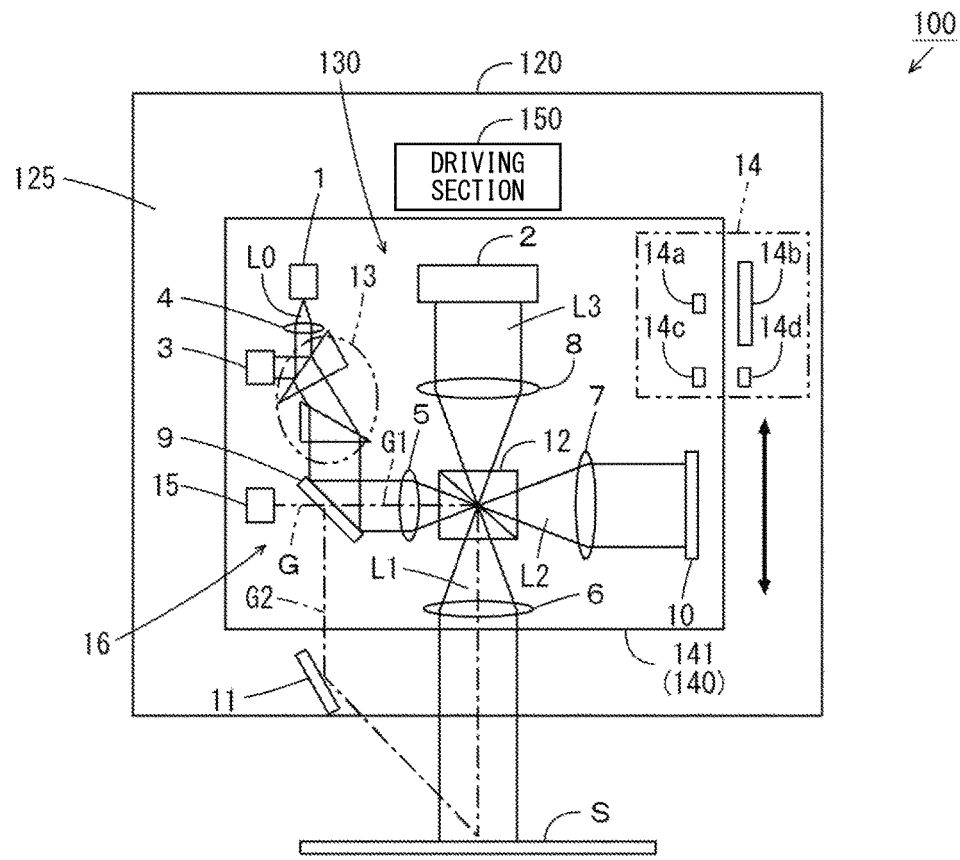
FIG. 2 is a schematic diagram of a measurement head.

FIG. 2 is a schematic diagram of the measurement head 100 mainly showing the configuration of the measuring unit 130. As shown in FIG. 2, the supporting section 125 is housed in the housing unit 120. The supporting section 125 may be formed integrally with the housing unit 120 or may be a part of the housing unit 120. The reciprocating mechanism 140 includes a movable section 141 capable of vibrating in parallel to one direction with respect to the supporting section 125. In FIG. 2, a vibrating direction of the movable section 141 is indicated by a thick arrow. In an example shown in FIG. 2, the vibrating direction of the movable section 141 is the up-down direction.

The measuring unit 130 includes a light projecting section 1, light receiving sections 2 and 3, a plurality of lenses 4 to 8, a plurality of mirrors 9 to 11, a beam splitter 12, an anamorphic prism pair 13, a position detecting section 14, and a guide light source 15. Parts of the mirror 11 and the position detecting section 14 of the measuring unit 130 are attached to the supporting section 125. On the other hand, the measuring unit 130 excluding the parts of the mirror 11 and the position detecting section 14 are attached to the movable section 141.

The light projecting section 1 includes, for example, an SLD (Super Luminescent Diode) and emits light. The light emitted by the light projecting section 1 is referred to as emitted light L0. Coherency of the emitted light L0 is relatively low. Specifically, the coherency of the emitted light L0 is higher than the coherency of light or white light emitted by a LED (Light Emitting Diode) and lower than the coherency of laser light. Therefore, the emitted light L0 has a plurality of peak wavelengths. The lens 4 is a collimator lens. The emitted light L0 is transmitted through the lens 4 to be collimated and is transmitted through the anamorphic prism pair 13 to be shaped to be circular in section.

Note that a part of the emitted light L0 is reflected without being transmitted through the anamorphic prism pair 13. The emitted light L0 reflected by the anamorphic prism pair 13 is received by the light receiving section 3. A light receiving signal indicating a light receiving amount is output to the control board 160 (FIG. 1). A light amount of the emitted light L0 is measured by the control board 160 on the basis of the light receiving signal output by the light receiving section 3. When the measured light amount of the emitted light L0 indicates an abnormal value, the operation of the light projecting section 1 is stopped by the control board 160. In this way, it is possible to manage the light amount of the emitted light using the emitted light not used for the measurement.

The reflectance of the mirror 9 has wavelength selectivity. Specifically, the mirror 9 has high reflectance (desirably 100%) in a wavelength region of the emitted light L0 and has reflectance lower than 100% in a wavelength region of guide light G explained below. The emitted light L0 transmitted through the anamorphic prism pair 13 is reflected by the mirror 9 and thereafter made incident on the beam splitter 12 while being condensed by being transmitted through the lens 5.

A part of the emitted light L0 is reflected by the beam splitter 12. The remaining part of the emitted light L0 is transmitted through the beam splitter 12. The emitted light L0 reflected by the beam splitter 12 and the emitted light L0 transmitted through the beam splitter 12 are respectively referred to as measurement light L1 and reference light L2.

A lens 6 is an objective lens. The measurement light L1 is collimated by being transmitted through the lens 6. A spot diameter of the measurement light L1 at this point is relatively large and is, for example, 4 mm or 10 mm. Thereafter, the measurement light L1 travels in substantially the same direction as a vibrating direction of the movable section 141 and is irradiated on a relatively large circular region of the measuring object S. A part of the measurement light L1 reflected by the measuring object S is made incident on the beam splitter 12 while being condensed by being transmitted through the lens 6.

The mirror 10 is a so-called reference mirror. The reference light L2 is collimated and irradiated on the mirror 10 be being transmitted through a lens 7. The reference light L2 reflected by the mirror 10 is made incident on the beam splitter 12 while being condensed by being transmitted through the lens 7. The measurement light L1 and the reference light L2 made incident on the beam splitter 12 interfere with each other and are guided to the light receiving section 2 as interference light L3. The operation of the light receiving section 2 is explained below.

The position detecting section 14 includes reading sections 14a and 14b, a scale 14c, and a magnet 14d. The reading sections 14a and 14b are attached to the movable section 141. The scale 14c and the magnet 14d are attached to the supporting section 125. The scale 14c has a plurality of gradations and is formed by glass extending in one direction. The reading section 14a is disposed to be opposed to a part of the scale 14c. The reading section 14a includes a light projecting element and a light receiving element. The reading section 14a optically reads a gradation of a portion of the scale 14c opposed to the reading section 14a to thereby detect relative positions of the movable section 141 with respect to the supporting section 125.

The reading section 14b is a Hall element and is disposed to detect magnetism by the magnet 14d. In this embodiment, a portion of the scale 14c read by the reading section 14a when the reading section 14b detects maximum magnetism is set as an origin. The origin of the scale 14c may be updated as appropriate during a start of the measurement head 100 or other points in time. According to detection results of the reading sections 14a and 14b, it is possible to specify an absolute position of the movable section 141.

In this embodiment, the reading sections 14a and 14b are attached to the movable section 141. The scale 14c and the magnet 14d are attached to the supporting section 125. However, the present invention is not limited to this. The reading sections 14a and 14b may be attached to the supporting section 125. The scale 14c and the magnet 14d may be attached to the movable section 141.

In this embodiment, the reading section 14a optically detects the position of the movable section 141. However, the present invention is not limited to this. The reading section 14a may detect the position of the movable section 141 according to, for example, other mechanical, electric, or magnetic systems. Further, when the reading section 14a is capable of detecting the absolute position of the movable section 141 or when it is unnecessary to detect the absolute position of the movable section 141, the position detecting section 14 does not have to include the reading section 14b and the magnet 14d.

The guide light source 15 is a laser light source that emits laser light having a wavelength in a visible region (in this example, a red region). The laser light emitted by the guide light source 15 is referred to as guide light G. In FIG. 2, the guide light G is indicated by an alternate long and short dash line. As explained above, the reflectance of the mirror 9 is lower than 100% in the wavelength region of the guide light G. Therefore, a part of the guide light G is transmitted through the mirror 9. The remaining part of the guide light G is reflected by the mirror 9. The guide light G transmitted through the mirror 9 and the guide light G reflected by the mirror 9 are respectively referred to as first and second guide lights G1 and G2.

The first guide light G1 is condensed by being transmitted through the lens 5 and is superimposed on the measurement light L1 by being reflected by the beam splitter 12. Consequently, the first guide light G1 travels in substantially the same direction as the vibrating direction of the movable section 141, collimated by being transmitted through the lens 6, and thereafter irradiated on the measuring object S.

The second guide light G2 is reflected by the mirror 11 attached to the supporting section 125 to thereby travel in a direction crossing the first guide light G1. The mirror 11 is disposed such that, when the movable section 141 is present in a predetermined position in the vibrating direction (e.g., near the origin of the scale 14c), the first guide light G1 and the second guide light G2 cross in the position of the focal point of the light receiving section 2.

In this way, a guide section 16 is configured by the mirror 9, the mirror 11, the beam splitter 12, and the guide light source 15. With this configuration, the user can easily locate the surface of the measuring object S on the focal point of the light receiving section 2 by disposing the surface of the measuring object S in the position where the first guide light G1 and the second guide light G2 cross.

In this embodiment, the emission of the guide light G by the guide light source 15 is performed in a non-measurement period T2 shown in FIG. 3 explained below and is not performed in a measurement period T1 shown in FIG. 3. For that reason, the measurement of the measuring object S is prevented from being affected by the guide light G. On the other hand, when the guide light G does not affect the measurement of the measuring object S, for example, when the light receiving section 2 is configured not to detect light in the wavelength band of the guide light G, the guide light source 15 may be controlled to emit the guide light G in the measurement period T1 as well.

In this embodiment, the guide section 16 is disposed such that the first and second guide lights G1 and G2 cross at the focal point of the light receiving section 2. However, the present invention is not limited to this. The guide section 16 may be disposed such that, when the surface of the measuring object S is present in the position of the focal point of the light receiving section 2, a pattern of the first guide light G1 and a pattern of the second guide light G2 projected on the surface of the measuring object S have a specific positional relation.

(3) Operation of the Measuring Unit

The movable section 141 is cyclically vibrated by the driving unit 150 in parallel to one direction with respect to the supporting section 125 in synchronization with a sampling signal. The sampling signal may be generated on the inside of the processing device 200 (FIG. 1) or may be given to the movable section 141 from the outside of the processing device 200. FIG. 3 is a diagram showing the vibration of the movable section 141. In FIG. 3, the horizontal axis indicates time and the vertical axis indicates the position of the movable section 141.

Figure 3:
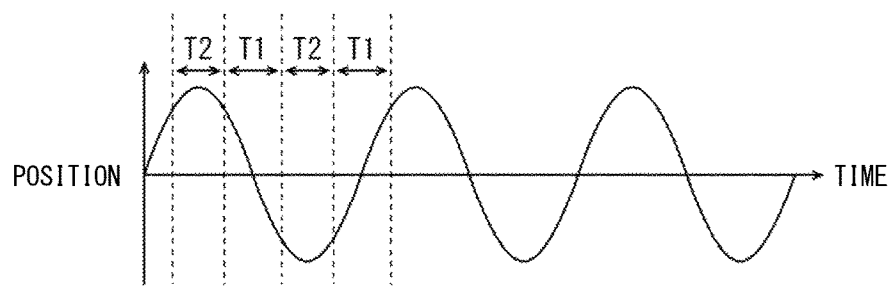
FIG. 3 is a diagram showing vibration of a movable section.

As shown in FIG. 3, in this embodiment, the position of the movable section 141 changes in a sine curve shape. In a period in which the position of the movable section 141 changes, the measurement of the measuring object S is performed in a part of the period and is not performed in the other period. The period in which the measurement of the measuring object S is performed is referred to as measurement period T1. The period in which the measurement is not performed is referred to as non-measurement period T2. In this embodiment, a period corresponding to a substantially linearly changing portion in the sine curve shown in FIG. 3 is allocated as the measurement period T1. A period corresponding to the vicinity of an inflection portion of the sine curve is allocated as the non-measurement period T2.

The control board 160 (FIG. 1) controls light reception timing of the light receiving section 2 on the basis of the sampling signal. The light receiving section 2 includes a two-dimensional area sensor in which a plurality of pixels are arrayed in the vertical direction and the horizontal direction. In this embodiment, the number of pixels in the vertical direction and the number of pixels in the horizontal direction of the area sensor are three hundred. A total number of pixels is ninety thousand. Consequently, it is possible to receive the interference light L3 having a relatively large spot diameter. The light receiving section 2 detects, on the basis of the control by the control board 160, a light receiving amount in each of positions of the movable section 141 concerning the pixels in the measurement period T1. On the other hand, the light receiving section 2 does not detect a light receiving amount in the non-measurement period T2.

Figure 4A:
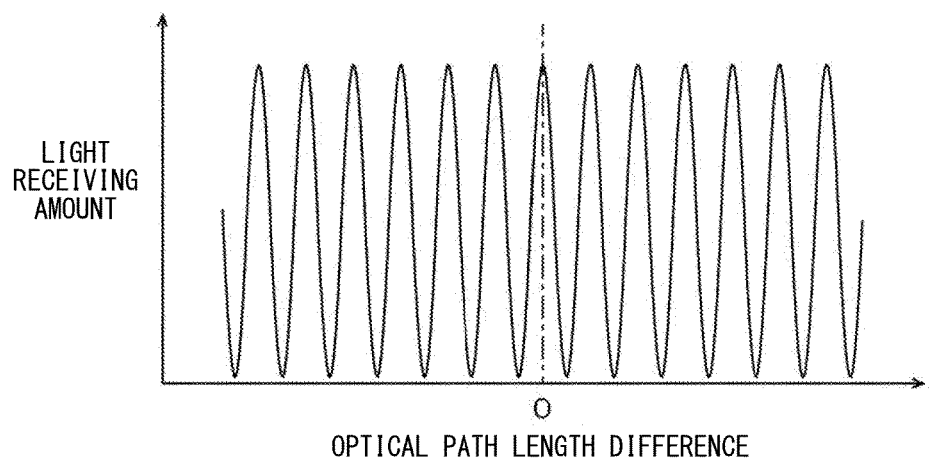
FIGS. 4A and 4B are diagrams showing a light receiving amount distribution that should be acquired by a light receiving section concerning any pixel.
Figure 4B:
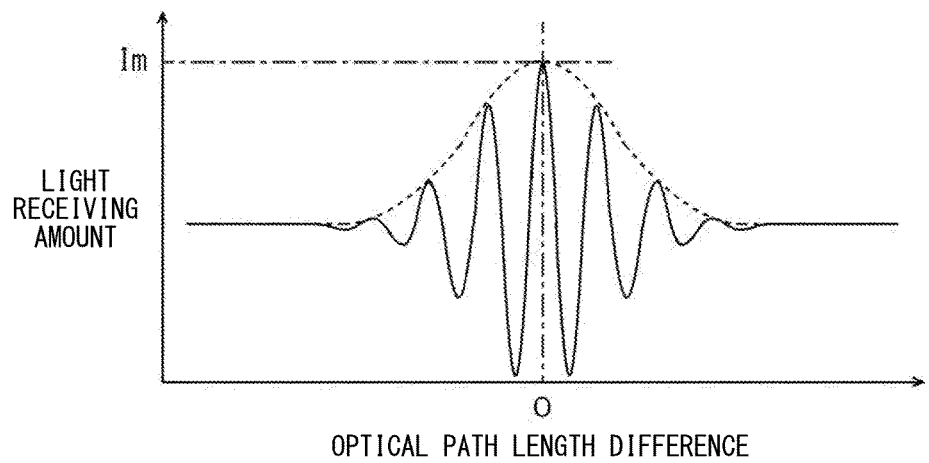

FIGS. 4A and 4B are diagrams showing a light receiving amount distribution that should be acquired by the light receiving section 2 concerning any pixel. In FIGS. 4A and 4B, the horizontal axis indicates a difference between an optical path length of the measurement light L1 and an optical path length of the reference light L2 and the vertical axis indicates a detected light receiving amount. The difference between the optical path length of the measurement light L1 and the optical path length of the reference light L2 is hereinafter referred to as optical path length difference. When the position of the movable section 141 changes, the optical path length of the reference light L2 does not change but the optical path length of the measurement light L1 changes. Therefore, the optical path length difference changes.

If the coherency of the emitted light L0 is high and the emitted light L0 has a single peak wavelength $\lambda$, the measurement light L1 and the reference light L2 intensify each other when the optical path length difference is $n \times \lambda$ and weaken each other when the optical path length difference is $(n+\frac{1}{2}) \times \lambda$. In the above description, n is any integer. For that reason, as shown in FIG. 4A, the light receiving amount fluctuates between a maximum and a minimum every time the optical path length difference changes by a half of the peak wavelength.

On the other hand, if the emitted light L0 has a plurality of peak wavelengths, the optical path length differences at the time when the measurement light L1 and the reference light L2 intensity each other and at the time when the measurement light L1 and the reference light L2 weaken each other are different at each of the peak wavelengths. For that reason, a light receiving amount distribution obtained by adding up the same light receiving amount distributions as the light receiving amount distribution shown in FIG. 4A different at each of the peak wavelengths is acquired. Specifically, as indicated by a solid line in FIG. 4B, a plurality of peaks appear in the light receiving amount distribution in a small range of the optical path length difference. A peak light receiving amount at the time when the optical path length is 0 is the largest. The peak light receiving amount decreases as the optical path length difference is larger. A range of the optical path length difference in which the peaks appear is wider as the coherency of the emitted light L0 is higher.

In this embodiment, as indicated by a dotted light in FIG. 4B, the light receiving section 2 specifies an envelope of the light receiving amount distribution and gives data indicating the specified envelope to the control board 160 as measurement data. The control board 160 specifies a point in time when the optical path length difference is 0 and a maximum light receiving amount Im on the basis of the envelope indicated by the acquired measurement data. The coherency of the emitted light L0 is higher than the coherency of light emitted by an LED. Therefore, peaks appear in a range of the optical path length difference wider than when the LED is used. Therefore, even if a frequency of the detection of a light receiving amount is reduced, it is possible to accurately specify the point in time when the optical path length difference is 0 and the maximum light receiving amount Im. Consequently, it is possible to increase the measurement in speed.

The control board 160 specifies, on the basis of a detection result of the position detecting section 14 (FIG. 2), the position of the movable section 141 at a point in time specified by the light receiving section 2. Further, the control board 160 generates pixel data on the basis of the specified position of the movable section 141 and the acquired maximum light receiving amount Im. The pixel data generated on the basis of the position of the movable section 141 is referred to as height data. The pixel data generated on the basis of the maximum light receiving amount Im is referred to as luminance data.

The control board 160 generates image data on the basis of a plurality of pixel data. The image data generated on the basis of the height data is referred to as height image data. The image data generated on the basis of the luminance data is referred to as luminance image data. The height image data indicates shapes (heights) of parts of the surface of the measuring object S. The luminance image data represents luminances of the parts of the surface of the measuring object S. The control board 160 generates, on the basis of the absolute position of the movable section 141 detected by the position detecting section 14, distance data indicating the distance from the measurement head 100 to the measuring object S. The control board 160 gives the generated height image data, luminance image data, and distance data to the processing device 200 (FIG. 1).

(4) A Height Image and a Luminance Image

The display unit 240 shown in FIG. 1 displays a height image on the basis of height image data and displays a luminance image on the basis of luminance image data. The height image represents, for example, differences among the heights of parts of the surface of the measuring object S as difference of colors. The luminance image represents, for example, differences among luminances of the surface of the measuring object S as differences of colors.

Figure 5A:
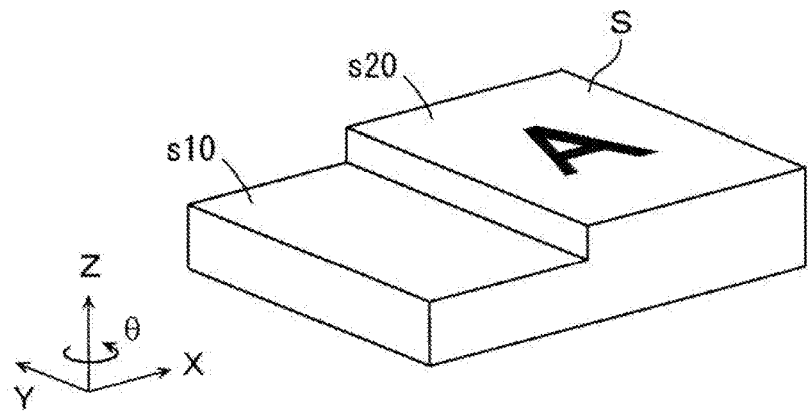
Figure 5A:
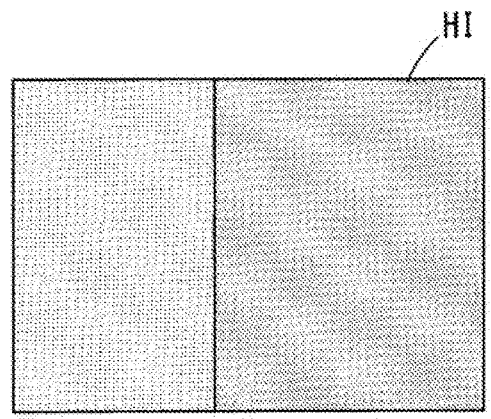
Figure 5A:
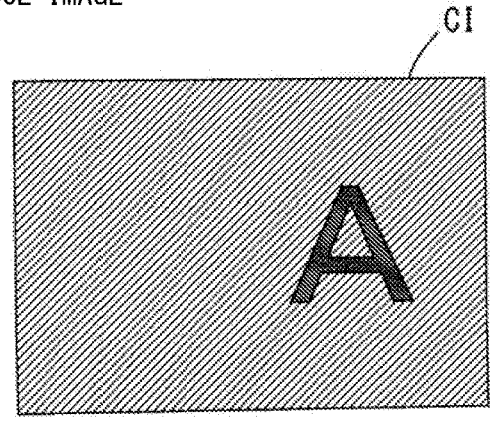

FIGS. 5A to 5C are diagrams for explaining the height image and the luminance image. In FIG. 5A, an example of the measuring object S is shown. In FIG. 5B, a height image of the measuring object S shown in FIG. 5A is shown. In FIG. 5C, a luminance image of the measuring object S shown in FIG. 5A is shown. In FIG. 5B, a difference between colors is indicated by a difference of dot patterns. In FIG. 5C, a difference between colors is indicated by a difference of hatchings.

The measuring object S shown in FIG. 5A includes a thin part s10 and a thick part s20. A character "A" is printed on the upper surface of the thick part s20. The height of the upper surface of the thin part s10 is different from the height of the upper surface of the thick part s20. For that reason, as shown in FIG. 5B, in a height image HI, the upper surface of the thin part s10 and the upper surface of the thick part s20 are represented by different colors. The upper surface of the thick part s20 is flat. For that reason, in the height image HI, the character "A" does not appear.

On the other hand, the luminance of the character "A" is different from the luminance around the character "A". For that reason, as shown in FIG. 5C, in a luminance image CI, the character "A" is represented by a color different from the portion around the character "A". The luminance of the thin part s10 and the luminance of the upper surface of the thick part s20 are the same. For that reason, in the luminance image CI, the upper surface of the thin part s10 and the upper surface of the thick part s20 are represented by the same color.

In this way, the height image data and the luminance image data include different kinds of information each other with respect to the same measuring object S and represent different images each other. A blend image, which is an intermediate image between the height image HI and the luminance image CI, may be displayed on the basis of the height image data and the luminance image data.

Figure 6:
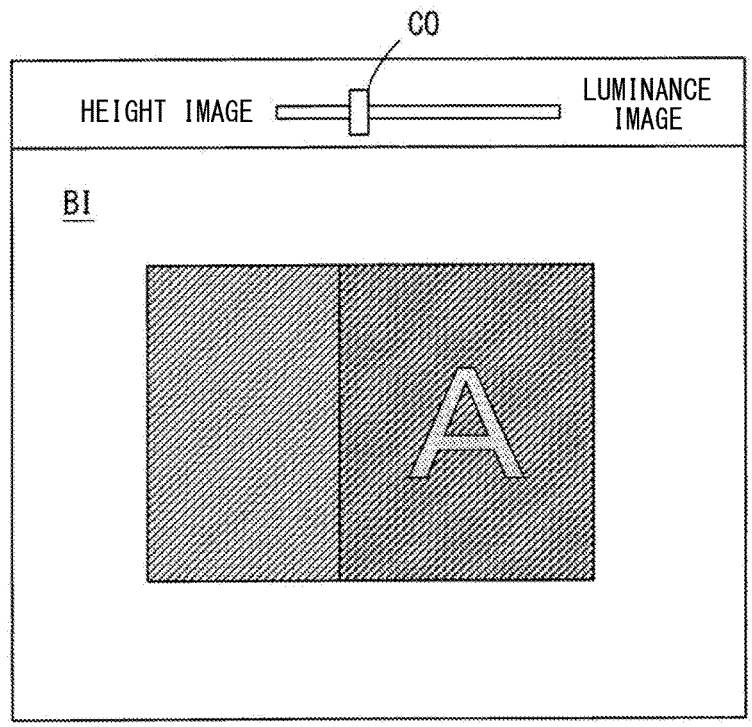
FIG. 6 is a diagram showing a display example of a blend image.

FIG. 6 is a diagram showing a display example of the blend image. As shown in FIG. 6, a blend image BI includes a component of the height image HI and a component of the luminance image CI. A ratio of the component of the height image HI and the component of the luminance image CI may be optionally adjustable. For example, as in the example shown in FIG. 6, a blend adjustment operator CO for adjusting the ratio of the components is displayed together with the blend image BI. The user can adjust the ratio of the component of the height image HI and the component of the luminance image CI in the blend image BI by operating the operation unit 230 shown in FIG. 1 to move the blend adjustment operator CO to the left and the right.

Auxiliary other image processing may be performed on the height image HI, the luminance image CI, and the blend image BI. For example, a light source may be virtually set. A shadow generated by light from the light source may be added to the images by a CG (computer graphics) technology. The gloss of the surface of the measuring object S may be added to the images by the CG technology.

Figure 7:
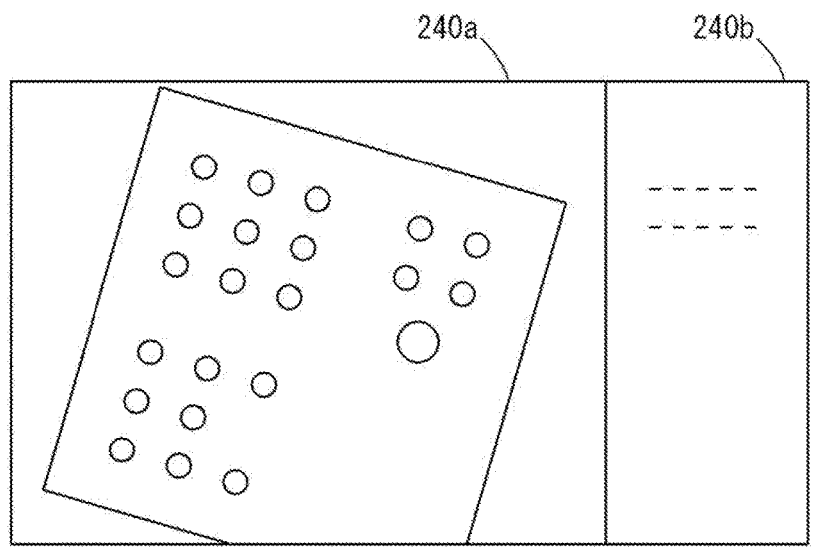
FIG. 7 is a diagram showing an example of a basic screen displayed on a display unit.

FIG. 7 is a diagram showing an example of a basic screen displayed on the display unit 240 shown in FIG. 1. The basic screen shown in FIG. 7 includes an image display section 240a and a measurement-value display section 240b. In the image display section 240a, a height image, a luminance image, or a blend image is displayed. In the measurement-value display section 240b, a measurement value or the like calculated on the basis of the height image data is displayed.

(5) Measurement

In this example, height image data and luminance image data of a reference object corresponding to the measuring object S are acquired in advance and stored in the storing unit 220 shown in FIG. 1. The reference object is desirably designed the same as the measuring object S and has dimension accuracy higher than dimension accuracy of the measuring object S with respect to a design value.

In the following explanation, the height image data and the luminance image data of the reference object are respectively referred to as reference height image data and reference luminance image data, which are collectively referred to as reference image data. The height image data and the luminance image data of the measuring object S are respectively referred to as measurement height image data and measurement luminance image data, which are collectively referred to as measurement image data. Further, in the following explanation, measurement means acquiring the height image data and the luminance image data and also means acquiring a measurement value such as a dimension.

Various kinds of setting are performed using the reference image data. Contents of the setting are stored in the storing unit 220 shown in FIG. 1 as measurement setting information. As the setting performed on the reference image data, there are setting of search conditions and setting of measurement conditions.

Figure 8A:
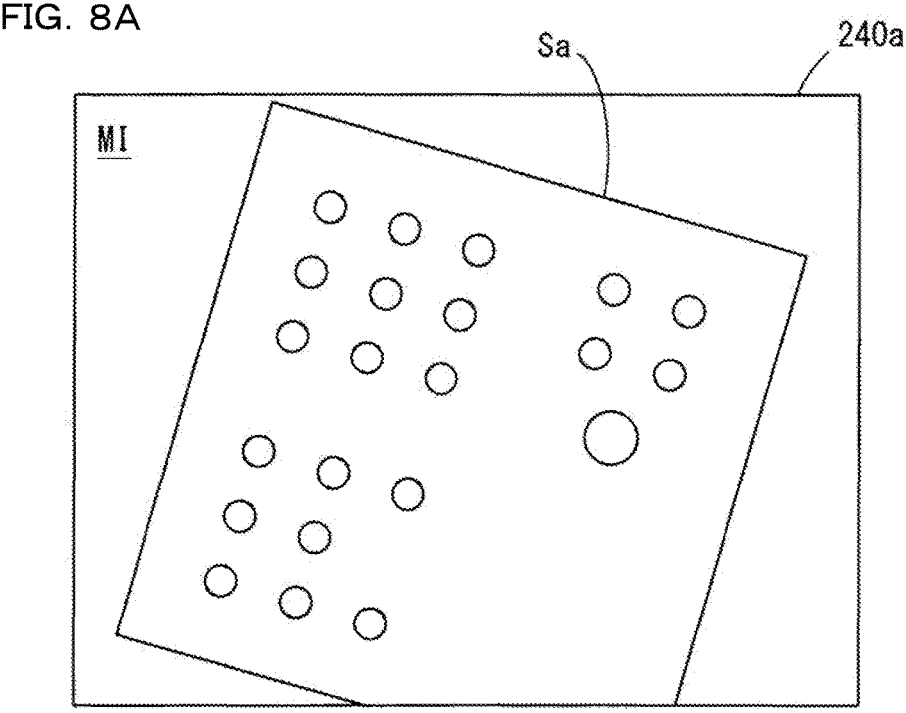
FIGS. 8A and 8B are diagrams for explaining setting of search conditions.
Figure 8B:
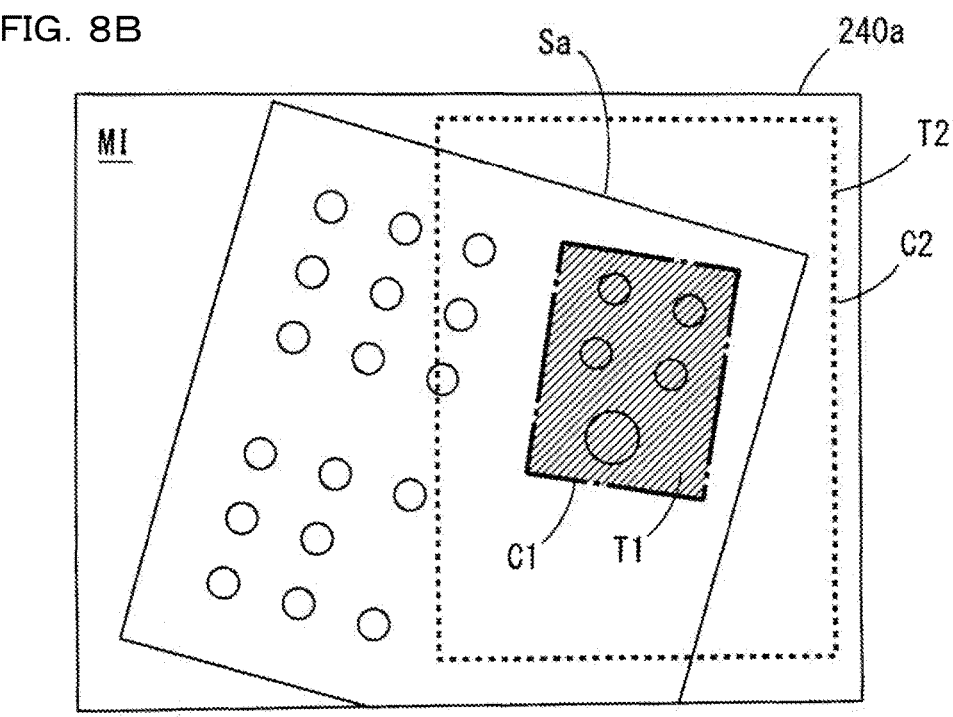

The search conditions are conditions for performing a pattern search on the measurement image data. The pattern search is processing for detecting a designated pattern. FIGS. 8A and 8B are diagrams for explaining the setting of the search conditions. In FIG. 8A, an example of a reference image displayed on the image display section 240a is shown. The reference image is a height image, a luminance image, or a blend image displayed according to the reference image data. A reference image MI shown in FIG. 8A represents a partial region of a reference object Sa. A region of the reference object Sa in the reference image MI is equivalent to a second region corresponding to the plurality of pixels of the light receiving section 2.

As shown in FIG. 8B, in the reference image MI displayed on the image display section 240a, a pattern region T1 and a search region T2 are set using designation frames C1 and C2. In this example, the designation frames C1 and C2 having rectangular shapes are used. However, the shapes of the designation frames C1 and C2 may be other shapes such as triangular shapes or circular shapes. The pattern region T1 and the search region T2 may be set by another method such as coordinate input.

The user can adjust the positions, the directions, and the sizes of the designation frames C1 and C2 by operating the operation unit 230 shown in FIG. 1. A region surrounded by the designation frame C1 is set as the pattern region T1. A region surrounded by the designation frame C2 is set as the search region T2.

Height information of a portion of the reference object corresponding to the pattern region T1 is acquired as pattern height information on the basis of the reference height image data. The height information is a set of height data. Luminance information of the portion of the reference object corresponding to the pattern region T1 is acquired as pattern luminance information on the basis of the reference luminance image data. The luminance information is a set of luminance data. The acquired pattern height information and pattern luminance information are stored in the storing unit 220 as the measurement setting information. A relative position of the pattern region T1 in the reference image MI and a relative position of the search region T2 in the reference image MI are stored in the storing unit 220 as the measurement setting information.

Figure 9A:
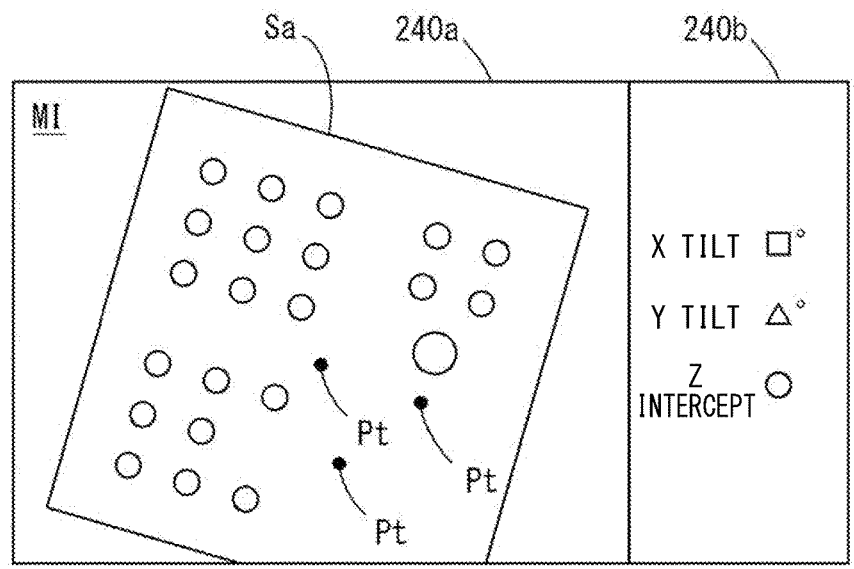
FIGS. 9A and 9B are diagrams for explaining setting of a reference plane.
Figure 9B:
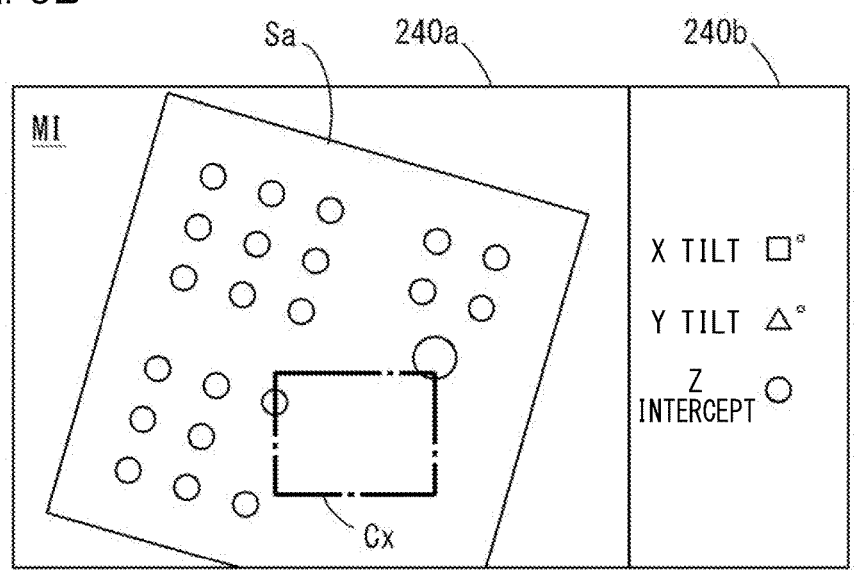

The setting of the measurement conditions is explained. An example is explained in which measurement of the height of a designated part (hereinafter referred to as height measurement) is performed. First, an imaginary plane serving as a reference of height is set as a reference plane. FIGS. 9A and 9B are diagrams for explaining the setting of the reference plane. In an example shown in FIG. 9A, a plurality of points Pt are designated on the reference image MI. In this case, a plurality of positions on the surface of the reference object Sa corresponding to the plurality of points Pt are specified on the basis of the reference height image data. An imaginary plane passing the specified plurality of positions is calculated. The plane is set as the reference plane. In an example shown in FIG. 9B, a partial region is designated by a designation frame Cx on the reference image MI. In this case, a region on the surface of the reference object Sa corresponding to the designated region is specified on the basis of the reference height image data. An imaginary plane having high coincidence with the specified region is calculated. The plane is set as the reference plane.

The set reference plane is stored in the storing unit 220 as the measurement setting information. In the examples shown in FIGS. 9A and 9B, a tilt with respect to the direction of the X axis (an X tilt), a tile with respect to the Y axis (a Y tilt), and an intercept with respect to the Z axis (a Z intercept) are respectively calculated concerning the detected reference plane and displayed on the measurement-value display section 240b.

Figure 10:
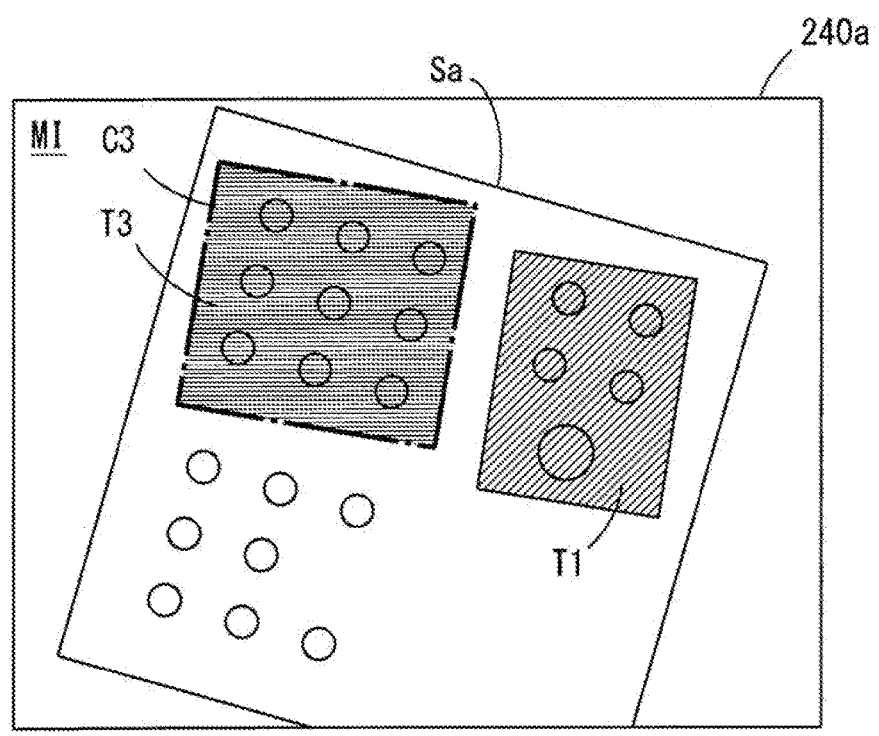
FIG. 10 is a diagram for explaining setting of a reference target region.

A target region of measurement is set as a reference target region on the reference image MI. FIG. 10 is a diagram for explaining the setting of the reference target region. In an example shown in FIG. 10, a reference target region T3 is set with respect to the reference image MI using a rectangular designation frame C3. The user can adjust the position, the direction, and the size of the designation frame C3 by operating the operation unit 230 shown in FIG. 1. A region surrounded by the designation frame C3 is set as a reference target region T3. The designation frame C3 may have a shape other than the rectangular shape. The reference target region T3 may be set by another method such as coordinate input. A relative position of the reference target region T3 in the reference image is stored in the storing unit 220 as the measurement setting information.

When the reference plane and the reference target region T3 are set in the reference image MI, height measurement of the reference object Sa is performed on the basis of the reference height image data. Specifically, a measurement value concerning the height of a portion on the surface of the reference object Sa corresponding to the reference target region T3 is calculated. In this case, a dimension in a direction orthogonal to the reference plane is calculated as height. As the measurement value, a maximum height, a minimum height, an average height, a difference between the maximum height and the minimum height (hereinafter referred to as inter-peak height), or the like may be calculated. These measurement values may be displayed in the measurement-value display section 240b.

Measurement processing for measurement image data is performed on the basis of the stored measurement setting information. The measurement processing performed when the search conditions and the measurement conditions are set as shown in FIGS. 8 to 10 is explained.

Figure 11A:
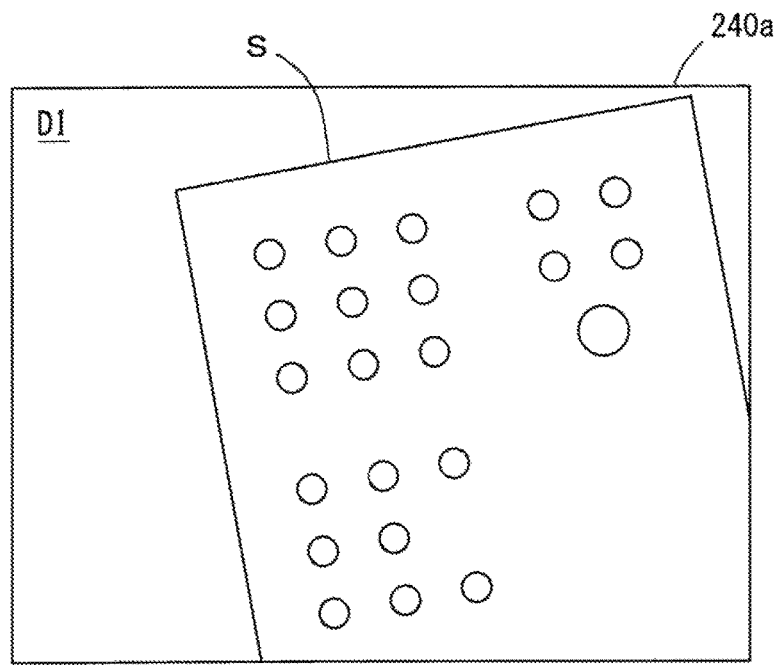
FIGS. 11A and 11B are diagrams for explaining an overview of a pattern search.
Figure 11B:
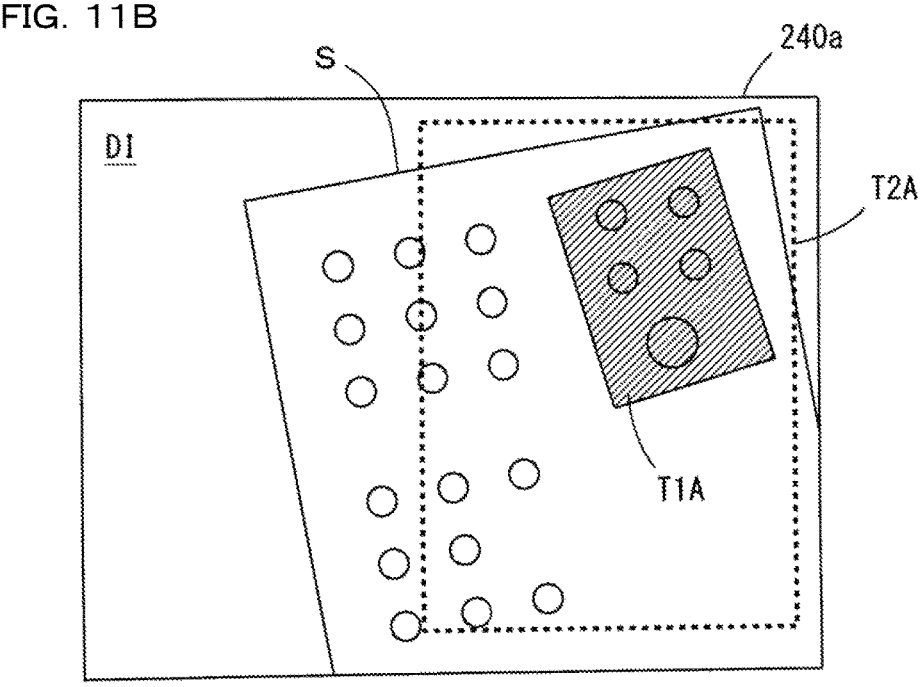

First, a pattern search is performed on the measurement image data on the basis of the set search conditions. FIGS. 11A and 11B are diagrams for explaining an overview of the pattern search. In FIG. 11A, an example of a measurement image displayed on the image display section 240a is shown. The measurement image is a height image, a luminance image, or a blend image represented by the measurement image data. A measurement image DI shown in FIG. 11A includes the measuring object S. A region of the measuring object S in the measurement image DI is equivalent to the second region corresponding to the plurality of pixels of the light receiving section 2.

As shown in FIG. 11B, in the measurement image DI, a region having the highest coincidence with the pattern region T1 (FIG. 8B) of the reference image MI is detected as a characteristic region T1A. In this embodiment, a pattern search (a double pattern search) for both of the measurement height image data and the measurement luminance image data is performed using the pattern height information and the pattern luminance information. The characteristic region T1A is detected on the basis of a result of the double pattern search. Details of the double pattern search are explained below.

In this example, a search region T2A of the measurement image DI is specified on the basis of the position of the set search region T2 (FIG. 8B). A relative position of the search region T2A in the measurement image DI is the same as the relative position of the search region T2 in the reference image MI. The detection of the characteristic region T1A is performed in the set search region T2A. In this way, the target region of detection is limited in this way. Consequently, it is possible to reduce a time required for the pattern search. Note that, when a reduction of the time is unnecessary or when it is difficult to specify a region that should be detected, the pattern search may be performed on the entire image DI without the search region T2 being set in the reference image MI.

Figure 12:
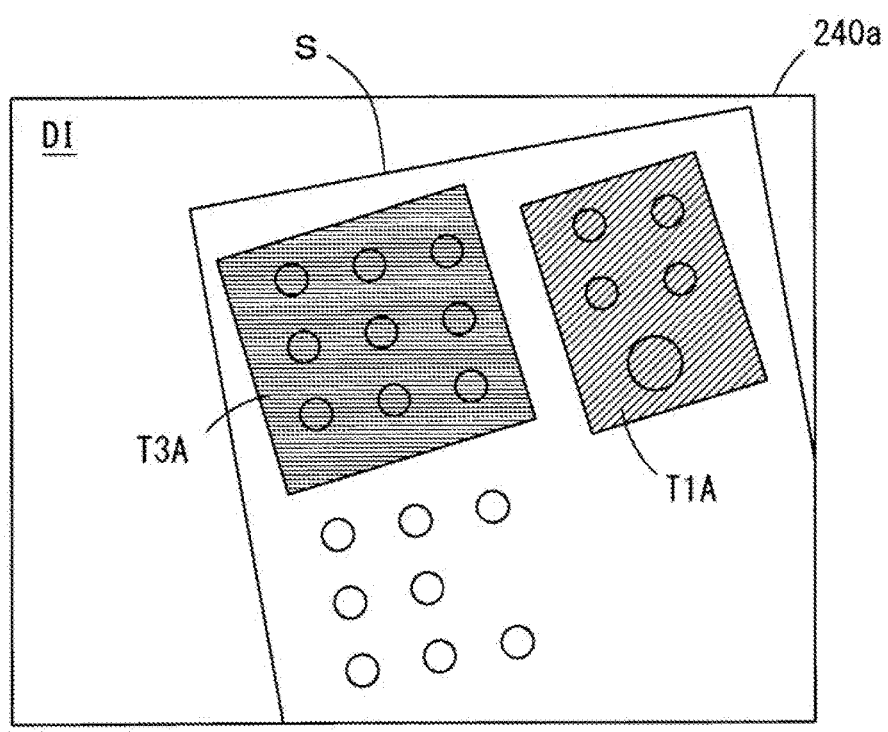
FIG. 12 is a diagram for explaining height measurement of a measuring object.

Subsequently, height measurement of the measuring object S is performed on the basis of the measurement height image data. FIG. 12 is a diagram for explaining the height measurement of the measuring object S. As shown in FIG. 12, a measurement target region T3A serving as a target of measurement is specified in the measurement image DI. In this example, a difference between the relative position of the pattern region T1 in the reference image MI and the relative position of the characteristic region T1A in the measurement image DI is calculated as a position correction amount. The measurement target region T3A is specified on the basis of the calculated position correction amount. In this case, a relative positional relation between the characteristic region T1A and the measurement target region T3A in the measurement image DI is equal to a relative positional relation between the pattern region T1 and the reference target region T3 in the reference image MI.

Subsequently, a measurement value concerning the height of a portion of the surface of the measuring object S corresponding to the measurement target region T3A is calculated on the basis of the measurement height image data. In this case, a dimension in a direction orthogonal to the reference plane stored as the measurement setting information is calculated as height. As the measurement value, a maximum height, a minimum height, an average height, an inter-peak height, or the like may be calculated. These measurement values may be displayed in the measurement-value display section 240b.

It may be determined whether the measurement value of the measuring object S is within an allowable range decided in advance (hereinafter referred to as tolerance determination). For example, an upper limit value and a lower limit value of the allowable range are decided on the basis of the measurement value of the reference object Sa. A result of the determination may be displayed on, for example, the measurement-value display section 240b shown in FIG. 7 or may be output to an external device such as a PLC (programmable logic controller).

(6) Functional Configuration

Figure 13:
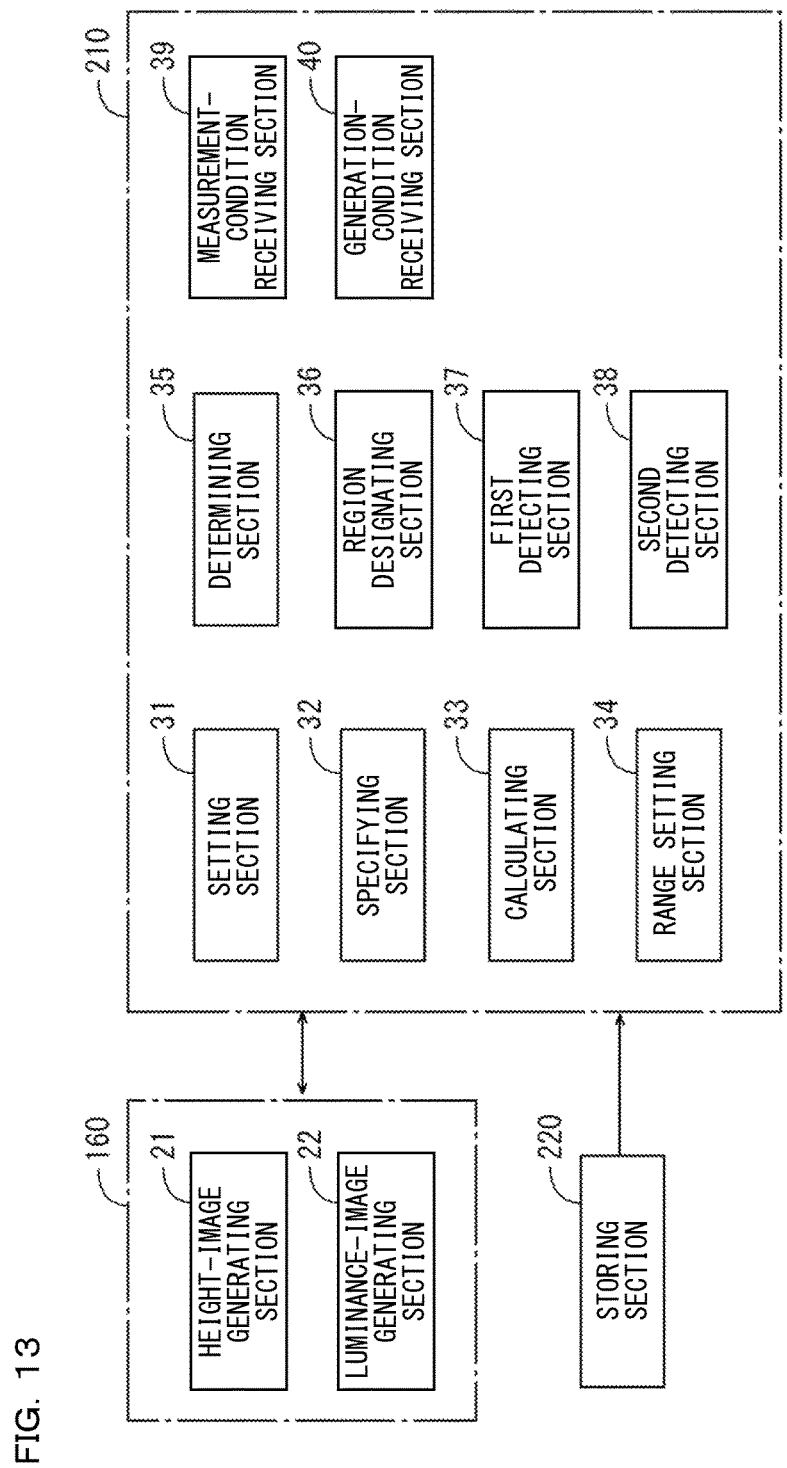
FIG. 13 is a functional block diagram showing functions realized by a control board, a control unit, and a storing unit.

FIG. 13 is a functional block diagram showing functions realized by the control board 160, the control unit 210, and the storing unit 220. A height image represented by reference height image data is referred to as reference height image. A height image represented by measurement height image data is referred to as measurement height image. A luminance image represented by reference luminance image data is referred to as reference luminance image. A luminance image represented by measurement luminance image data is referred to as measurement luminance image.

As shown in FIG. 13, the control board 160 includes a height-image generating section 21 and a luminance-image generating section 22. The height-image generating section 21 generates, on the basis of a relative position of the movable section 141 with respect to the supporting section 125 detected by the position detecting section 14 and a light receiving amount of the light receiving section, measurement height image data including height information of the first region of the measuring object S, which corresponds to the plurality of pixels of the light receiving section 2, and representing a height image of the first region as a measurement height image. The luminance-image generating section 22 generates, on the basis of light receiving amounts of the plurality of pixels of the light receiving section 2, measurement luminance image data representing a luminance image of the first region of the measuring object S as a measurement luminance image. The first region is equivalent to a region of the measuring object S included in a measurement image.

The storing unit 220 stores, in advance, reference luminance image data representing a luminance image of the second region of the reference object Sa, which corresponds to the measuring object S, as a reference luminance image and reference height image data including height information of the second region of the reference object Sa and representing a height image of the second region as a reference height image. The second region is equivalent to a region of the reference object Sa included in a reference image.

The control unit 210 includes a setting section 31, a specifying section 32, a calculating section 33, a range setting section 34, a determining section 35, a region designating section 36, a first detecting section 37, a second detecting section 38, a measurement-condition receiving section 39, and a generation-condition receiving section 40. The setting section 31 sets a reference target region in the reference luminance image. The specifying section 32 sets a measurement target region corresponding to the reference target region in the measurement height image on the basis of a relative positional relation between the first region in the measurement height image and the second region in the reference height image or a relative positional relation between the first region in the measurement luminance image and the second region in the reference luminance image. The calculating section 33 calculates a measurement value concerning the height of the measuring object S in the measurement target region on the basis of the measurement height image data.

The range setting section 34 sets an allowable range of a measurement value. The determining section 35 determines whether the measurement value calculated by the calculating section 33 is within the allowable range set by the range setting section 34 (tolerance determination). The region designating section 36 sets a search height region in the reference height image and sets a search luminance region in the reference luminance image. In this example, the pattern region T1 is equivalent to the search height region and the search luminance region.

The first detecting section 37 detects a corresponding height region corresponding to the search height region from the measurement height image. The second detecting section 38 detects a corresponding luminance region corresponding to the search luminance region from the measurement luminance image. In this example, the characteristic region T1A is equivalent to the corresponding height region and the corresponding luminance region. In this case, the specifying section 32 generates first correction information representing a relative positional relation between the search height region in the reference height image and the corresponding height region in the measurement height image and generates second correction information representing a relative positional relation between the search luminance region in the reference luminance image and the corresponding luminance region in the measurement luminance image. In this example, a position correction amount A explained below is equivalent to the first correction information and a position correction amount B explained below is equivalent to the second correction information. The specifying section 32 selects one correction information of the first and second correction information and specifies a measurement target region on the basis of the selected correction information.

The measurement-condition receiving section 39 receives setting of measurement conditions in the measurement target region. In this case, the calculating section 33 calculates a measurement value under the set measurement conditions. The generation-condition receiving section 40 receives setting of generation conditions for measurement height image data. In this case, the height-image generating section 21 generates the measurement height image data on the basis of the set generation conditions.

The functional sections explained above may be realized by the CPU executing a computer program stored in a ROM or the like or may be realized by hardware such as an electronic circuit.

(7) Operation of the Control Unit

Figure 14:
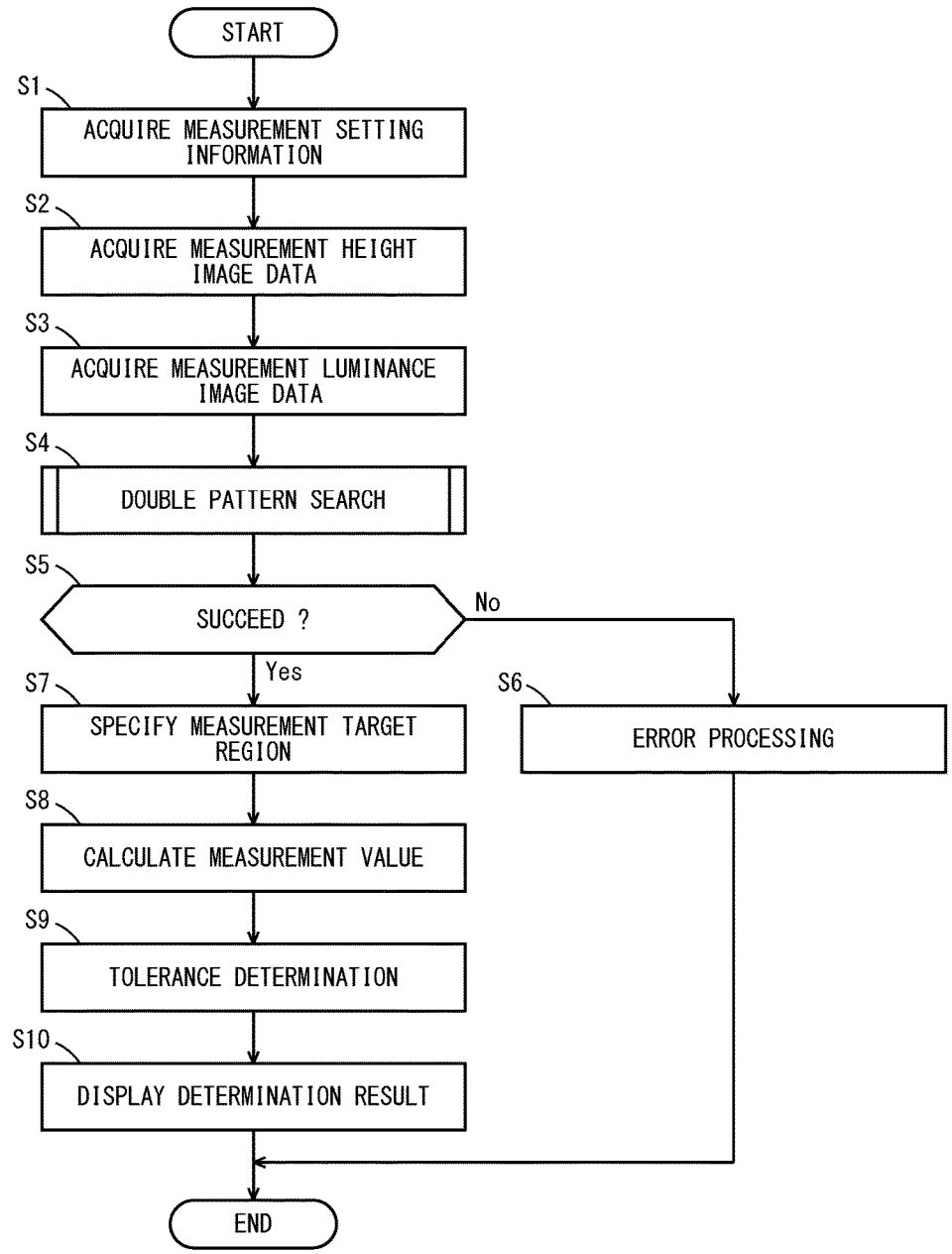
FIG. 14 is a flowchart for explaining an example of the operation of the control unit during measurement processing.

The operation of the control unit 210 during the measurement processing of the measuring object S is explained. FIGS. 14 to 17 are flowcharts for explaining an example of the operation of the control unit 210 during the measurement processing. As shown in FIG. 14, first, the control unit 210 acquires the measurement setting information stored in the storing unit 220 (step S1). The control unit 210 acquires measurement height image data and measurement luminance image data from the measurement head 100 (steps S2 and S3). Subsequently, the control unit 210 performs the double pattern search on both of the acquired measurement height image data and measurement luminance image data (step S4). Details of the double pattern search are explained below.

Subsequently, the control unit 210 determines whether the control unit 210 succeeds in the double pattern search (step S5). When the control unit 210 fails in the double pattern search, the control unit 210 notifies occurrence of an error to the user through error processing (step S6) and ends the processing. As the error processing, for example, an error screen is displayed on the display unit 240.

When the control unit 210 succeeds in the double pattern search, the control unit 210 specifies the measurement target region T3A in the measurement image DI on the basis of a result of the double pattern search (step S7). Subsequently, the control unit 210 calculates a measurement value according to the measurement conditions included in the measurement setting information on the basis of the measurement height image data (step S8). Subsequently, the control unit 210 performs the tolerance determination on the basis of the calculated measurement value (step S9). Thereafter, the control unit 210 displays a result of the tolerance determination on the display unit 240 (step S10). The result of the tolerance determination may be output to the external device. Consequently, a series of processing by the control unit 210 ends.

The double pattern search in step S4 is explained. When the region of the measuring object S represented by the measurement height image data does not have a characteristic height distribution, a characteristic portion does not appear in a height image. Therefore, in the pattern search for the measurement height image data, it is likely that a part not corresponding to a set pattern region is erroneously detected as a characteristic region. On the other hand, when the region of the measuring object S represented by the measurement luminance image data does not have a characteristic luminance distribution, a characteristic portion does not appear in the luminance image. Therefore, in the pattern search for the measurement luminance image data, it is likely that a part not corresponding to the set pattern region is erroneously detected as a characteristic region. Therefore, in this embodiment, the pattern search is performed on both of the measurement height image data and the measurement luminance image data. A measurement target region is specified on the basis of results of the pattern search performed on both of the measurement height image data and the measurement luminance image data.

Figure 15:
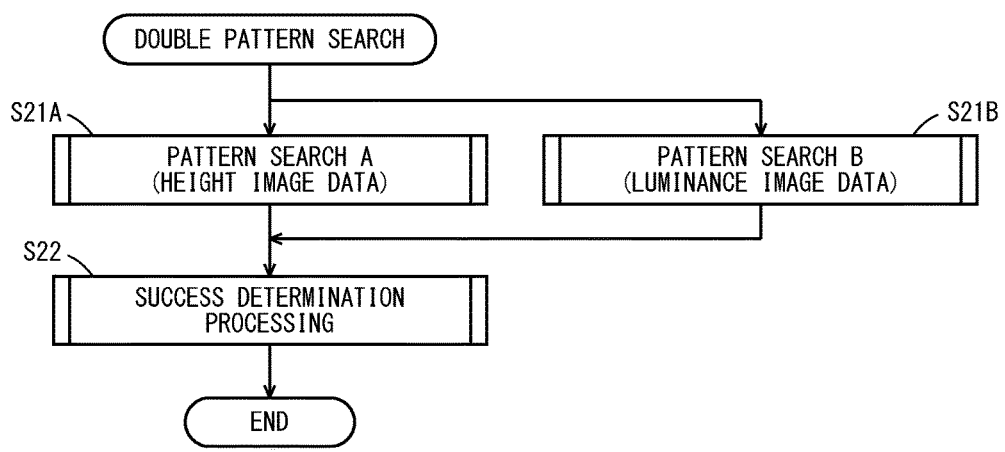
FIG. 15 is a flowchart for explaining the example of the operation of the control unit during the measurement processing.

Referring to FIG. 15, the control unit 210 performs, in parallel, the pattern search for the measurement height image data acquired in step S2 in FIG. 14 and the pattern search for the measurement luminance image data acquired in step S3 in FIG. 14 (step S21A and step S21B). In the following explanation, the pattern search for the measurement height image data is referred to as pattern search A and the pattern search for the measurement luminance image data is referred to as pattern search B. Thereafter, the control unit 210 performs success determination processing on the basis of results of the pattern searches A and B (step S22) and proceeds to step S5 in FIG. 14.

Figure 16:
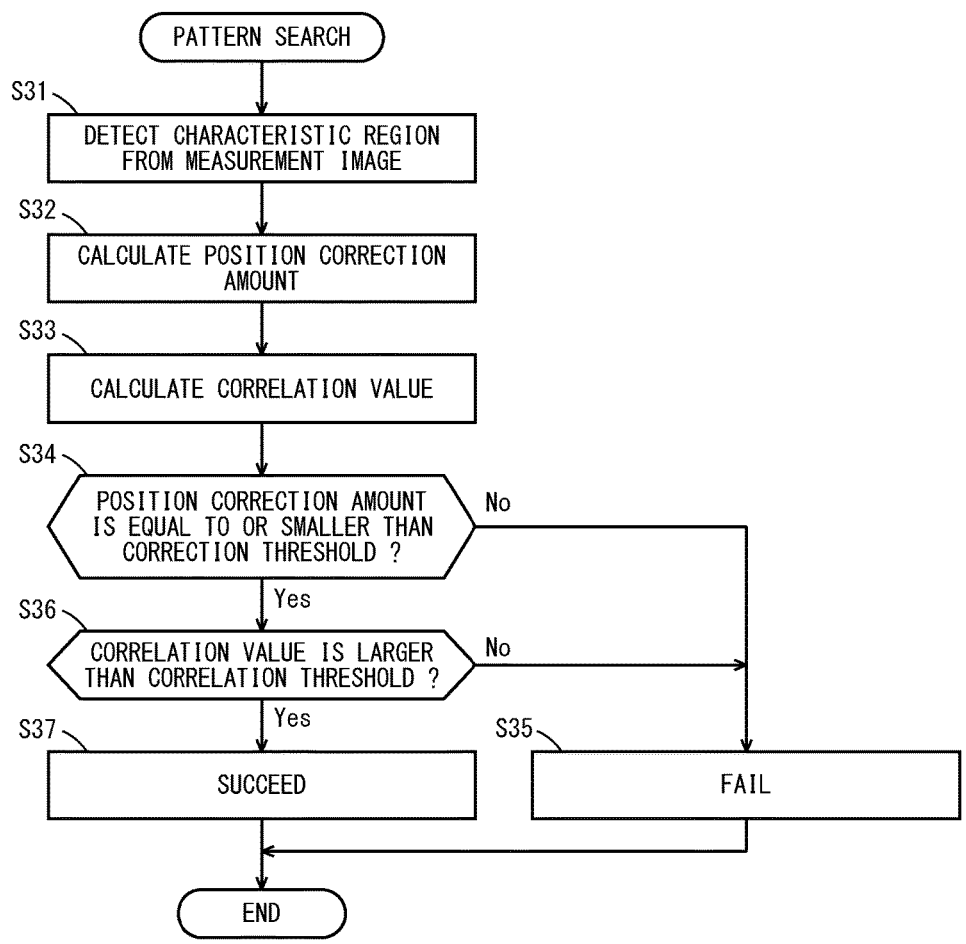
FIG. 16 is a flowchart for explaining the example of the operation of the control unit during the measurement processing.

The pattern searches in step S21A and step S21B are explained with reference to FIG. 16. In the pattern search A in step S21A, the measurement height image data is used as the measurement image data. In the pattern search B in step S21B, the measurement luminance image data is used as the measurement image data. The control unit 210 detects a characteristic region from a measurement image on the basis of the measurement image data (step S31). Specifically, in the pattern search A, the control unit 210 detects a region having height information having highest coincidence with pattern height information as a characteristic region in a height image represented by the measurement height image data. In the pattern search B, the control unit 210 detects a region having luminance information having highest coincidence with pattern luminance information as a characteristic region in a luminance image represented by the measurement luminance image data.

Subsequently, the control unit 210 calculates, as a position correction amount, a difference between a relative position of a characteristic region in a measurement image and a relative position of a pattern region in a reference image (step S32). Subsequently, the control unit 210 calculates a correlation value indicating a level of coincidence of the characteristic region and the pattern region (step S33). Specifically, in the pattern search A, the control unit 210 calculates a correlation value indicating a level of coincidence of the detected height information of the characteristic region and the acquired pattern height information. In the pattern search B, the control unit 210 calculates a correlation value indicating a level of correlation of the detected luminance information of the characteristic region and the acquired pattern luminance information.

Subsequently, the control unit 210 determines whether the position correction amount calculated in step S32 is equal to or smaller than a correction threshold decided in advance (step S34). When the position correction amount is larger than the correction threshold, the control unit 210 determines that the control unit 210 fails in the pattern search (step S35). Specifically, the control unit 210 fails in the pattern search when a difference between a relative position of the characteristic region in the measurement image and a relative position of the pattern region in the reference image is large.

When the position correction amount is equal to or smaller than the correction threshold, the control unit 210 determines whether the correlation value calculated in step S33 is larger than a correlation threshold decided in advance (step S36). When the correlation value is equal to or smaller than the correlation threshold, the control unit 210 determines that the control unit 210 fails in the pattern search. Specifically, the control unit 210 fails in the pattern search when coincidence of height information or luminance information of the characteristic region of the measurement image and height information or luminance information of the pattern region of the reference image is low.

When the correlation value is larger than the correlation threshold, the control unit 210 determines that the control unit 210 succeeds in the pattern search (step S37). Thereafter, the control unit 210 proceeds to success determination processing in FIG. 17.

Figure 17:
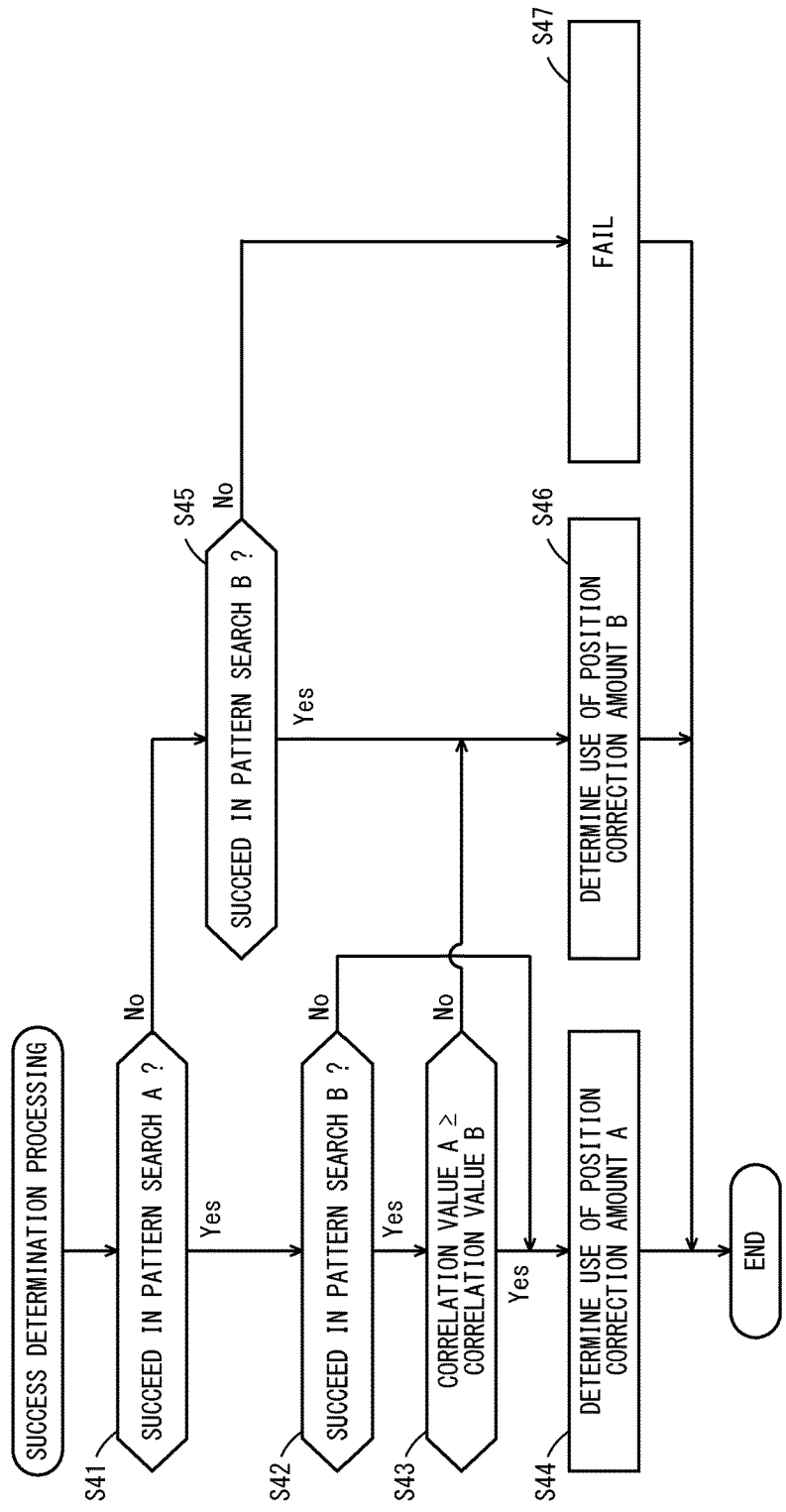
FIG. 17 is a flowchart for explaining the example of the operation of the control unit during the measurement processing.

The success determination processing in step S22 in FIG. 15 is explained with reference to FIG. 17. The control unit 210 determines whether the control unit 210 succeeds in the pattern search A in step S21A in FIG. 15 (step S41). When the control unit 210 succeeds in the pattern search A, the control unit 210 determines whether the control unit 210 succeeds in the pattern search B in step S21B in FIG. 15 (step S42). When the control unit 210 succeeds in the pattern search B, the control unit 210 determines whether the correlation value (hereinafter referred to as correlation value A) calculated in step S33 of the pattern search A is equal to or larger than the correlation value (hereinafter referred to as correlation value B) calculated in step S33 in the pattern search B (step S43). When the correlation value A is equal to or larger than the correlation value B, the control unit 210 determines that the position correction amount (hereinafter referred to as position correction amount A) calculated in step S32 of the pattern search A is used to specify a measurement target region (step S7 in FIG. 14) (step S44) and proceeds to step S5 in FIG. 14.

When the control unit 210 fails in the pattern search B in step S42, that is, when the control unit 210 succeeds in only the pattern search A of the pattern searches A and B, the control unit 210 proceeds to step S44 and determines use of the position correction amount A.

When the control unit 210 fails in the pattern search A in step S41, the control unit 210 determines whether the control unit 210 succeeds in the pattern search B (step S45). When the control unit 210 succeeds in the pattern search B in step S45, that is, when the control unit 210 succeeds in only the pattern search B of the pattern searches A and B, the control unit 210 determines that the position correction amount (hereinafter referred to as position correction amount B) calculated in step S32 of the pattern search B is used to specify a measurement target region (step S7 in FIG. 14) (step S46) and proceeds to step S5 in FIG. 14.

When the control unit 210 fails in the pattern search B in step S45, that is, when the control unit 210 fails in both of the pattern searches A and B, the control unit 210 determines that the control unit 210 fails in the double pattern search (step S47) and proceeds to step S5 in FIG. 14. In this case, error processing in step S6 in FIG. 14 is performed.

In this way, the characteristic regions are respectively detected from the height image and the luminance image and the position correction amounts A and B are calculated from a result of the detection by the double pattern search. Further, correlation values with the pattern region are calculated concerning the detected characteristic regions. A position correlation amount having higher reliability of the position correction amounts A and B is selected on the basis of the calculated correlation values. Consequently, when the measuring object S does not have a characteristic height distribution and when the measuring object S does not have a characteristic luminance distribution, it is possible to appropriately specify a measurement target region.

(8) Other Measurement Examples

Other measurement may be performed instead of or in addition to the height measurement. In the following explanation, as other measurement examples, step measurement, multi-point height measurement, and profile measurement are explained.

(8-1) Step Measurement

Figure 18A:
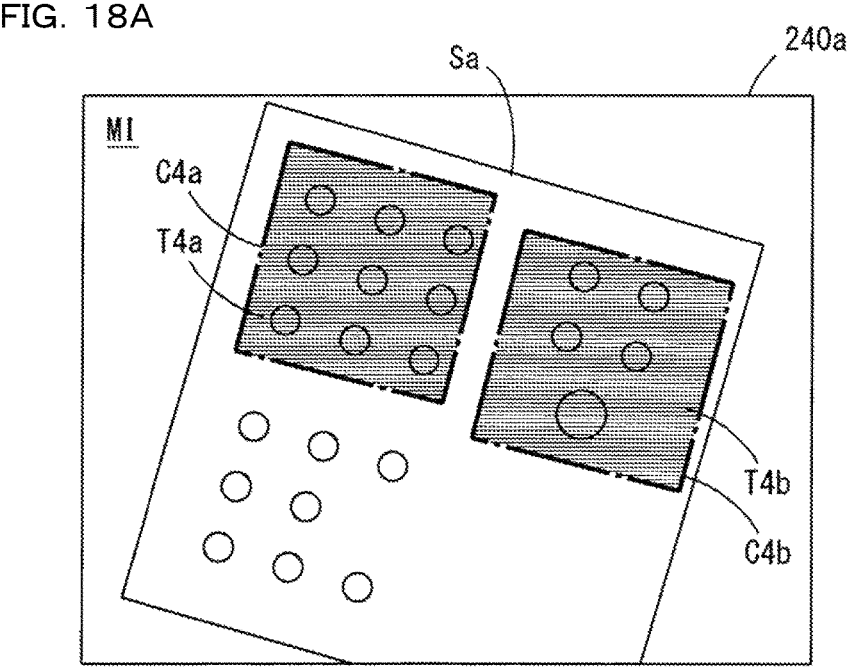
FIGS. 18A and 18B are diagrams for explaining step measurement.
Figure 18B:
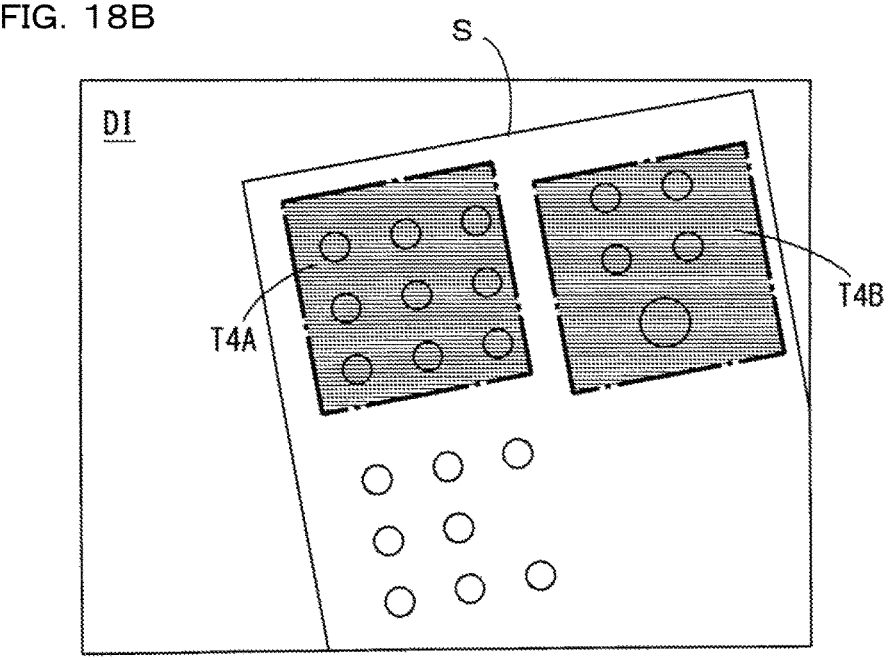

In the step measurement, measurement of a different plurality of parts of the measuring object S is performed. FIGS. 18A and 18B are diagrams for explaining the step measurement. First, as shown in FIG. 18A, during setting of measurement conditions, the user adjusts the sizes, the directions, and the positions of designation frames C4$a$ and C4$b$ on the reference image MI. Regions surrounded by the designation frames C4$a$ and C4$b$ are set as reference target regions T4$a$ and T4$b$.

During the measurement processing, as shown in FIG. 18B, measurement target regions T4A and T4B corresponding to the reference target regions T4$a$ and T4$b$ are specified on the measurement image DI. Specifically, as in the height measurement, the measurement target regions T4A and T4B are specified on the basis of the position correction amount calculated by the pattern search. Thereafter, measurement values in the respective measurement target regions T4A and T4B are calculated on the basis of the measurement height image data.

In this case, it is possible to compare the measurement value in the measurement target region T4A and the measurement value in the measurement target region T4B. For example, a difference between the measurement value in the measurement target region T4A and the measurement value in the measurement target region T4B is calculated. Specifically, a difference between a maximum height in the measurement target region T4A and a maximum height in the measurement target region T4B, a difference between a minimum height in the measurement target region T4A and a minimum height in the measurement target region T4B, a difference between an average height in the measurement target region T4A and an average height in the measurement target region T4B, or the like is calculated. Further, the tolerance determination may be performed for the calculated difference.

In an example shown in FIGS. 18A and 18B, two reference target regions are set and measurement values in two measurement target regions are acquired. However, it is also possible that three or more reference target regions are set and measurement values in three or more measurement target regions are acquired. Differences among the measurement values in the three or more measurement target regions may be calculated.

(8-2) Multi-Point Height Measurement

Figure 19A:
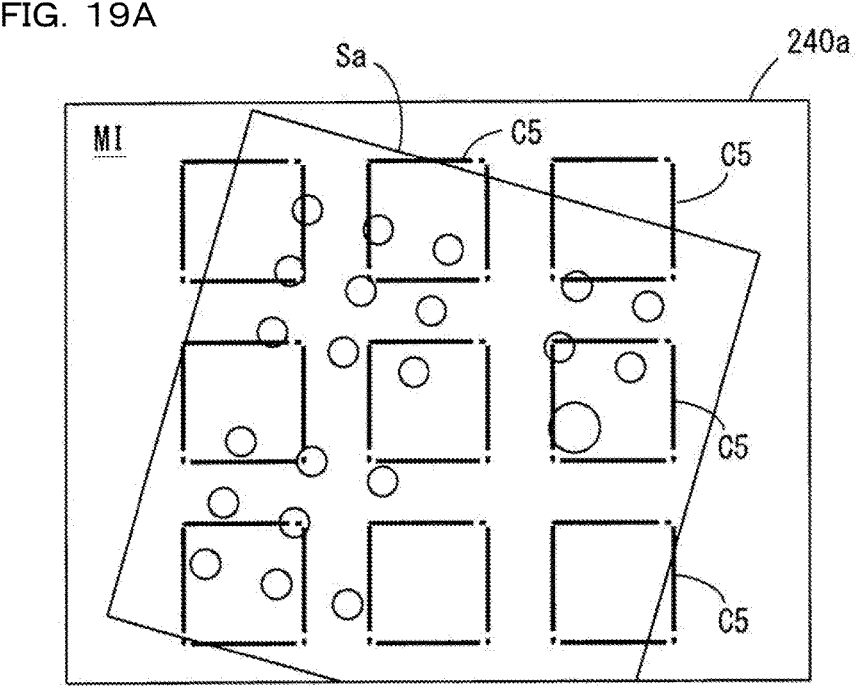
FIGS. 19A and 19B are diagrams for explaining multi-point height measurement.
Figure 19B:
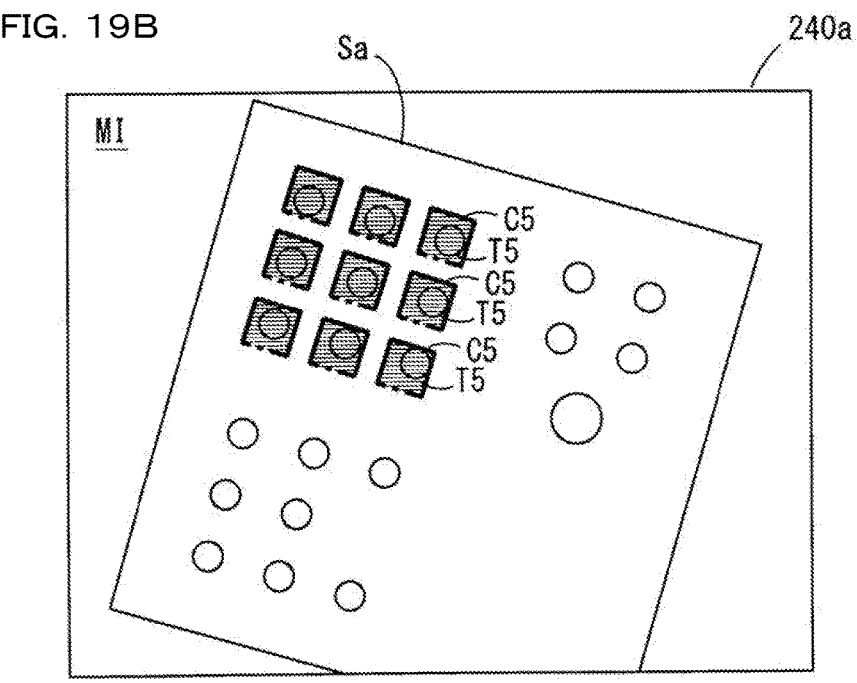
Figure 20:
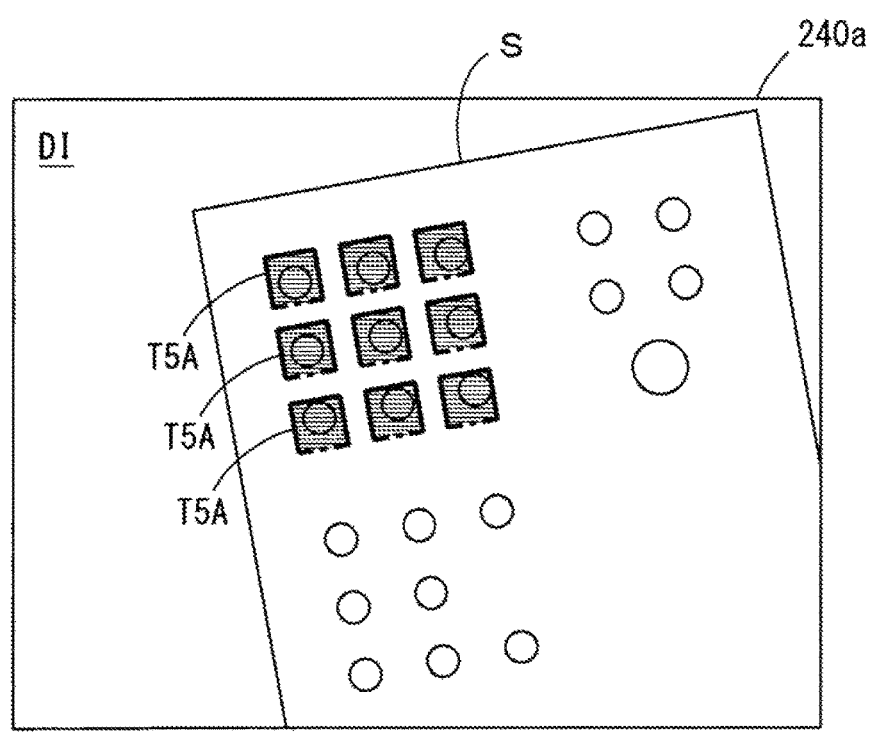
FIG. 20 is a diagram for explaining the multi-point height measurement.

In the multi-point measurement, measurement of a plurality of parts regularly arranged on the measuring object S is performed. FIGS. 19A to 20 are diagrams for explaining the multi-point height measurement. During setting of measurement conditions, as shown in FIG. 19A, the number of rows and the number of columns of a reference target region that should be set are set. In an example shown in FIG. 19A, each of the number of rows and the number of columns of the reference target region that should be set is set to three. In this case, a plurality of designation frames C5 regularly arranged in three rows and three columns are displayed. Subsequently, the user operates the operation unit 230 shown in FIG. 1 to integrally adjust the sizes, the directions, and the positions of the plurality of designation frames C5. In an example shown in FIG. 19B, the plurality of designation frames C5 are integrally reduced and are integrally moved to desired positions. Regions surrounded by the plurality of designation frames C5 are set as reference target regions T5. Note that a part of the plurality of designation frames C5 can be invalidated. The regions in the invalidated designation frames C5 are not set as the reference target regions T5. Consequently, it is possible to highly flexibly set the reference target regions T5 according to the arrangement of the parts that should be measured.

During measurement processing, as shown in FIG. 20, a plurality of measurement target regions T5A corresponding to the plurality of reference target regions T5 are specified on the measurement image DI. Specifically, as in the height measurement, the plurality of measurement target regions T5A are specified on the basis of a position correction amount calculated by the pattern search. Thereafter, measurement values in the plurality of measurement target regions T5A are calculated on the basis of measurement height image data.

For example, when measurement of a plurality of parts regularly arranged like a BGA (ball grid array) is performed, by using the multi-point height measurement, it is possible to easily set the reference target regions T5 in the plurality of parts that should be measured and quickly perform measurement.

(8-3) Profile Measurement

In the profile measurement, measurement is performed for a sectional shape (a profile) of the measuring object S. FIGS. 21A to 22B are diagrams for explaining the profile measurement.

Figure 21A:
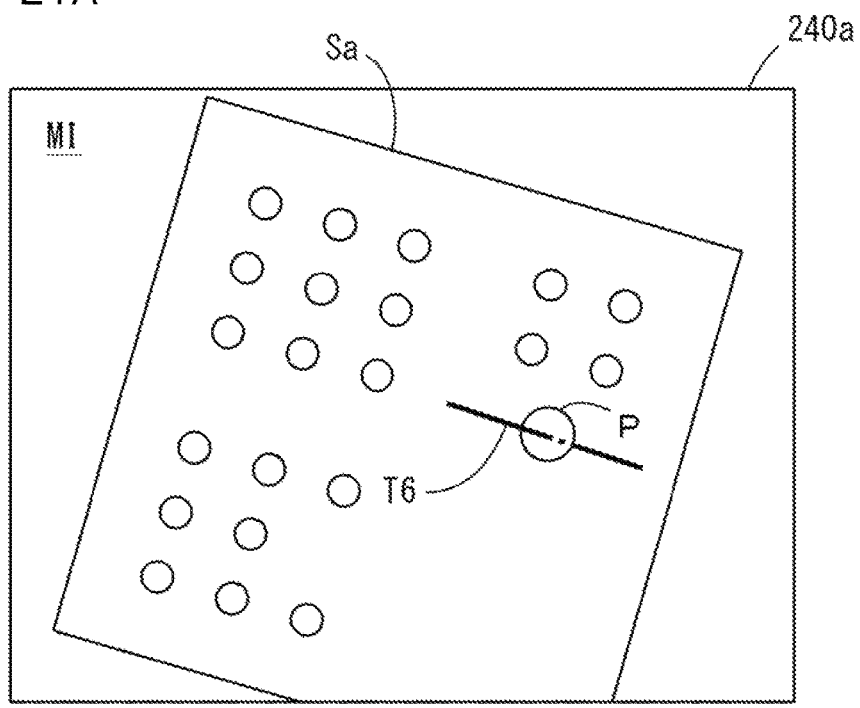
FIGS. 21A and 21B are diagrams for explaining profile measurement.
Figure 21B:
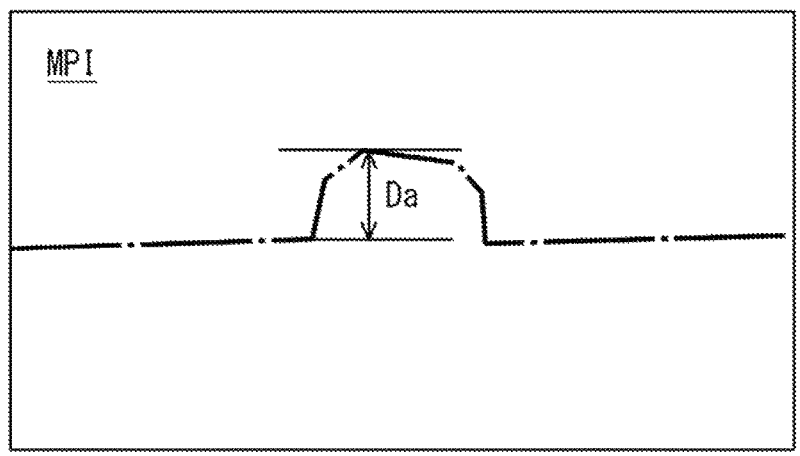

During setting of measurement conditions, as shown in FIG. 21A, in the reference image MI, the user designates a position where a profile should be acquired (hereinafter referred to as profile acquisition position) T6. In an example shown in FIG. 21A, the profile acquisition position T6 is designated to traverse a convex portion P provided on the upper surface of the reference object Sa. In this case, as shown in FIG. 21B, a profile image MPI representing a profile of the profile acquisition position T6 is displayed on the basis of reference height image data. For example, the profile image MPI is displayed side by side with the reference image MI in the image display section 240a shown in FIG. 7. Note that it is also possible that a plurality of profile acquisition positions T6 are set and the profile image MPI representing an average profile of the set plurality of profile acquisition positions T6 is displayed. Subsequently, a target that should be measured is designated on the profile image PI. In an example shown in FIG. 21B, a projection length Da of the convex portion P is designated as the target that should be measured.

Figure 22A:
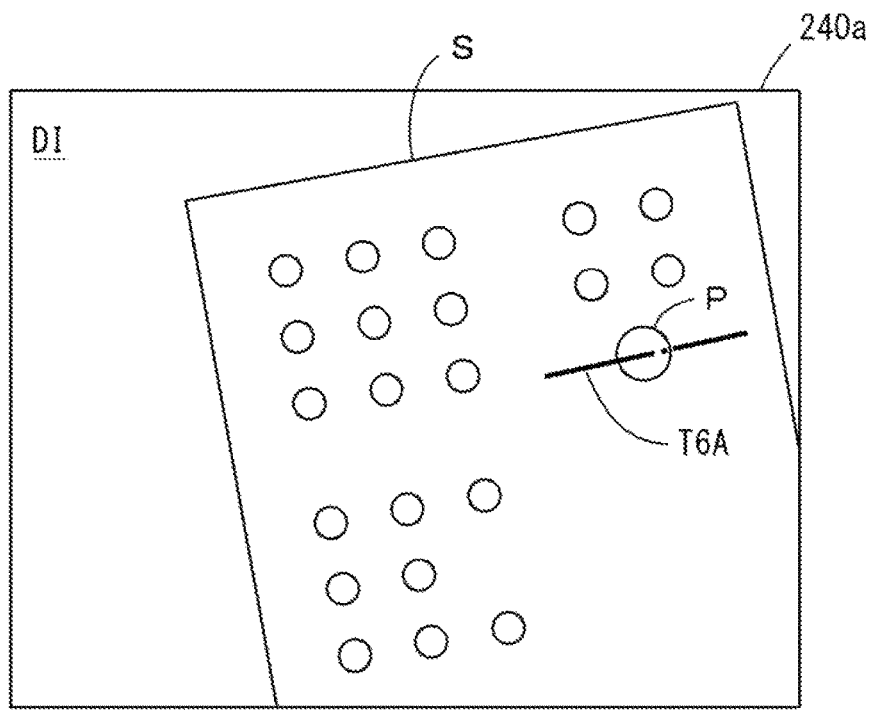
FIGS. 22A and 22B are diagrams for explaining the profile measurement.
Figure 22B:
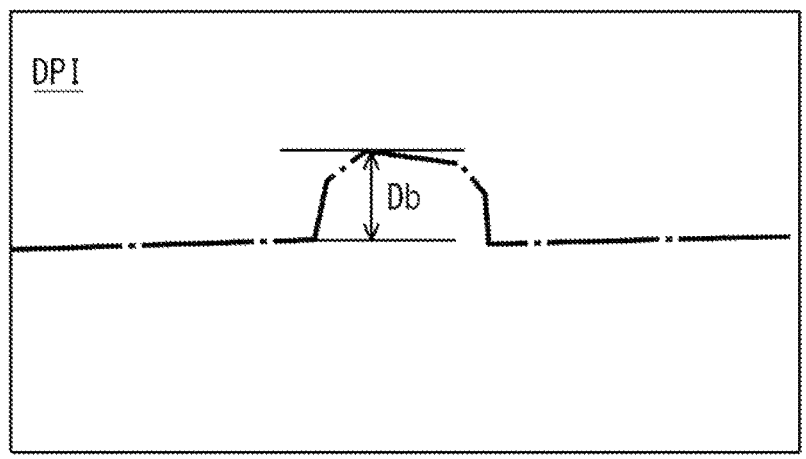

During measurement processing, as shown in FIG. 22A, the profile acquisition position T6A corresponding to the profile acquisition position T6 is specified on the measurement image DI. Specifically, as in the height measurement, the profile acquisition position T6A is specified on the basis of a position correction amount calculated by the pattern search. As shown in FIG. 22B, a profile image DPI representing a profile of the profile acquisition position T6A is displayed on the basis of measurement height image data. Further, in the profile image DPI, a projection length Db corresponding to the projection length Da is set as a target that should be measured. In this case, the projection length Db is calculated on the basis of the measurement height image data.

In the profile measurement, a part that should be measured can be designated on the profile image MPI. Therefore, it is possible to easily designate a part that is hard to be designated on plane images such as a height image and a luminance image. Consequently, it is possible to highly flexibly acquire a measurement value of a desired part of the measuring object S.

In this way, a plurality of measurement conditions are selectively set. Consequently, it is possible to efficiently acquire a measurement value of a desired part of the measuring object S.

(9) Setting Concerning the Operation of the Measurement Head

Figure 23:
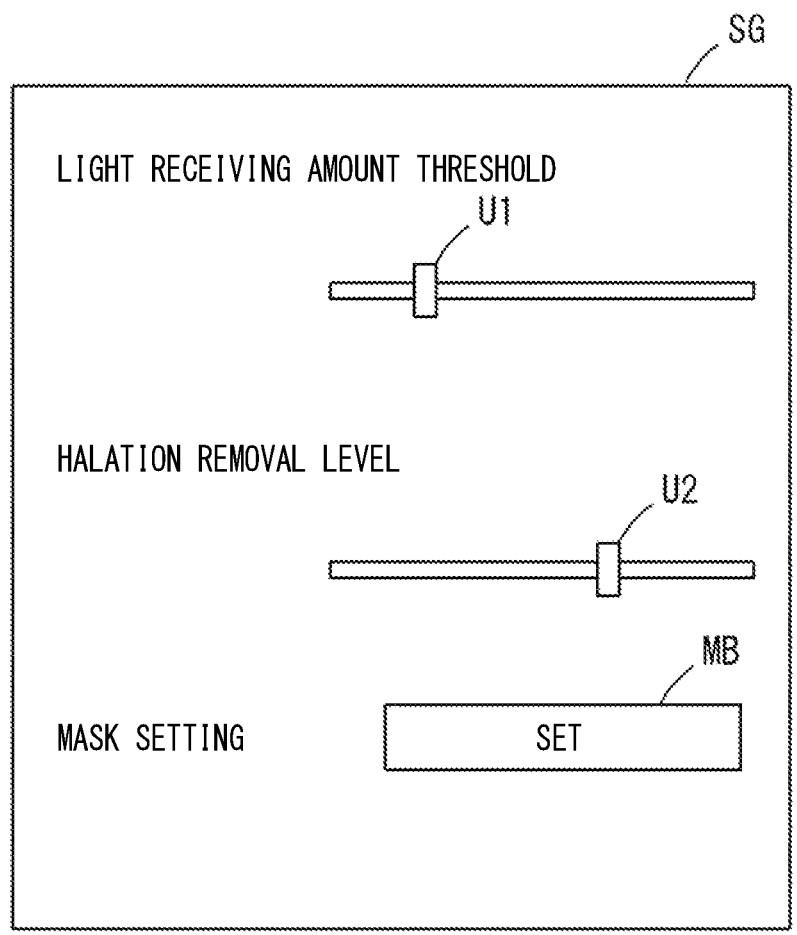
FIG. 23 is a diagram showing an example of a setting screen for performing setting concerning the operation of the measurement head.

In this embodiment, it is possible to perform setting concerning the operation of the measurement head 100 on a screen of the display unit 240. FIG. 23 is a diagram showing an example of a setting screen for performing the setting concerning the operation of the measurement head 100. The user can perform adjustment of a light receiving amount threshold, adjustment of a halation removal level, and mask setting on a setting screen SG shown in FIG. 23.

Figure 24A:
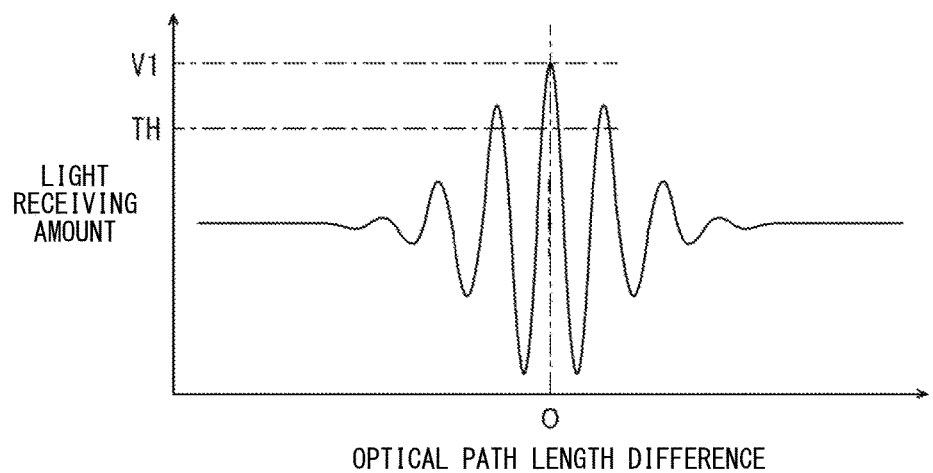
FIGS. 24A and 24B are diagrams for explaining a light receiving amount threshold.
Figure 24B:
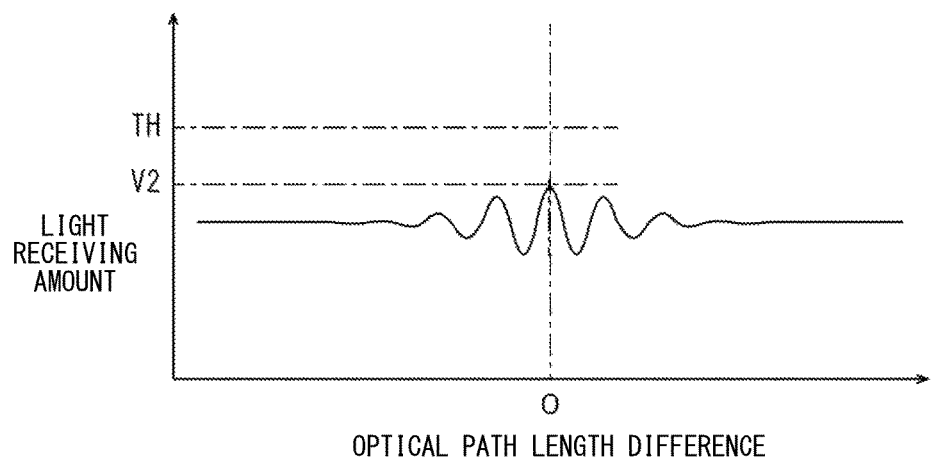

FIGS. 24A and 24B are diagrams for explaining the light receiving amount threshold. In FIGS. 24A and 24B, a light receiving amount distribution of any pixel of the light receiving section 2 (FIG. 2) is shown. The horizontal axis indicates an optical path length difference between an optical path length of measurement light and an optical path length of reference light. The vertical axis indicates a light receiving amount.

In this example, when a value of a peak of a light receiving amount (a maximum light receiving amount) is equal to or larger than a light receiving amount threshold, the control board 160 shown in FIG. 1 generates height data on the basis of the position of the peak. The position of the peak is specifically the position of the movable section 141 at the time when the peak appears. On the other hand, when the value of peak in the light receiving amount distribution is smaller than the light receiving amount threshold, the control board 160 shown in FIG. 1 generates height data under another condition or does not generate height data. The other condition is a condition that, for example, height data indicating a minimum decided in advance is generated. In an example shown in FIG. 24A, a value V1 of the peak of the light receiving amount is larger than a light receiving amount threshold TH. For that reason, height data is generated on the basis of the position of the acquired peak. On the other hand, in an example shown in FIG. 24B, a value V2 of the peak of the light receiving amount is smaller than the light receiving amount threshold TH. For that reason, high data is generated under the other condition or height data is not generated.

When the value of the peak of the light receiving amount is small as in the example shown in FIG. 24B, it is likely that the peak appears not because the light receiving section 2 receives reflected light from the measuring object S but the peak appears as noise. Height data generated on the basis of such peak has low reliability. Therefore, reliability of height data is secured by setting the light receiving amount threshold.

The user can adjust the light receiving amount threshold by moving an operator U1 to the left and the right on the setting screen SG shown in FIG. 23. For example, when the user grasps a range of a light receiving amount of reflected light from the measuring object S in advance, the user can appropriately eliminate height information having low reliability by adjusting the light receiving amount threshold to include the range.

A halation removal level represents a reduction degree of halation (a white void). When light having high intensity is made incident on the light receiving section 2, halation occurs in the reference image and the measurement image. The user can adjust a halation removal level by moving an operator U2 to the left and the right on the setting screen SG shown in FIG. 23. Consequently, it is possible to appropriately remove the halation from the reference image and the measurement image.

Figure 25:
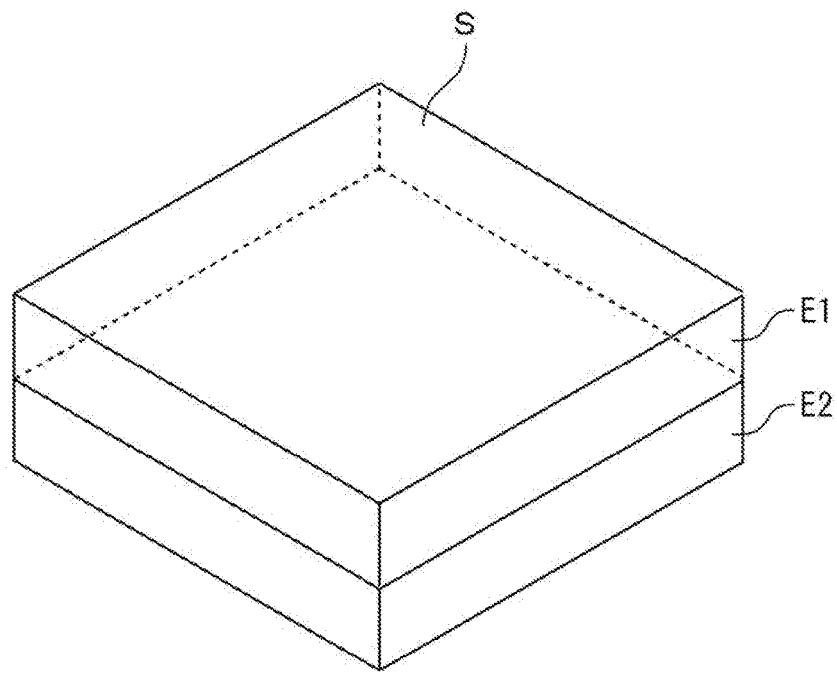
FIG. 25 is an exterior perspective view showing another example of the measuring object.

Mask setting is explained. FIG. 25 is an exterior perspective view showing another example of the measuring object S. The measuring object S shown in FIG. 25 includes a transmission member E1 and a non-transmission member E2. The transmission member E1 has light transmissivity. The non-transmission member E2 does not have light transmissivity. The transmission member E1 and the non-transmission member E2 are vertically stacked each other.

Figure 26:
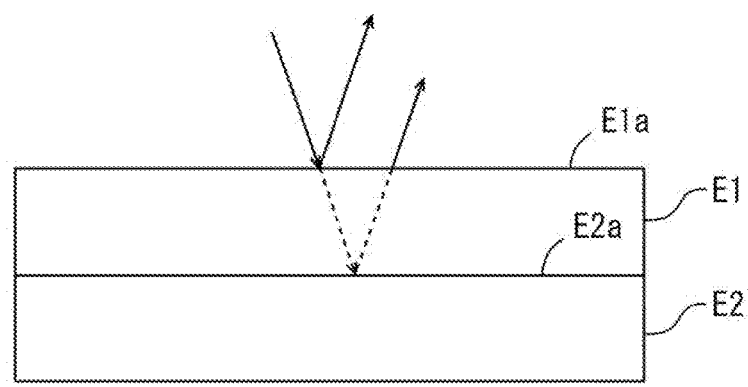
FIG. 26 is a schematic diagram for explaining reflection of measurement light irradiated on the measuring object shown in FIG. 25.

FIG. 26 is a schematic diagram for explaining reflection of measurement light irradiated on the measuring object S shown in FIG. 25. As shown in FIG. 26, a part of light irradiated on the measuring object S is reflected on an upper surface E1a of the transmission member E1. Another part of the light is transmitted through the transmission member E1 and reflected on an upper surface E2a of the non-transmission member E2. Consequently, the reflected lights from the two surfaces having different heights are made incident on a common pixel of the light receiving section 2.

In this case, in the pixel on which the reflected lights from the two surfaces are made incident, two peaks occur in the light receiving amount distribution. On the other hand, height image data includes only height data with respect to one pixel. For that reason, when a plurality of peaks are present in alight receiving amount distribution of one pixel, height data is generated on the basis of the position of one peak among the plurality of peaks. Usually, height data is generated on the basis of the position of the peak having a largest value among the plurality of peaks. However, the intensity of reflected light on a surface including a part that should be measured is sometimes smaller than the intensity of reflected light on a surface at another height. In that case, when height image data is generated on the basis of only the position of the peak having the largest value, desired measurement cannot be performed. For example, in the measuring object S shown in FIG. 25, even if height data of the upper surface E1a of the transmission member E1 is necessary, when the intensity of the reflected light on the upper surface E1a of the transmission member E1 is lower than the intensity of the reflected light on the upper surface E2a of the non-transmission member E2, only height data of the upper surface E2a of the non-transmission member E2 is obtained. For that reason, a measurement value concerning the upper surface E1a of the transmission member E1 is not obtained.

Figure 27:
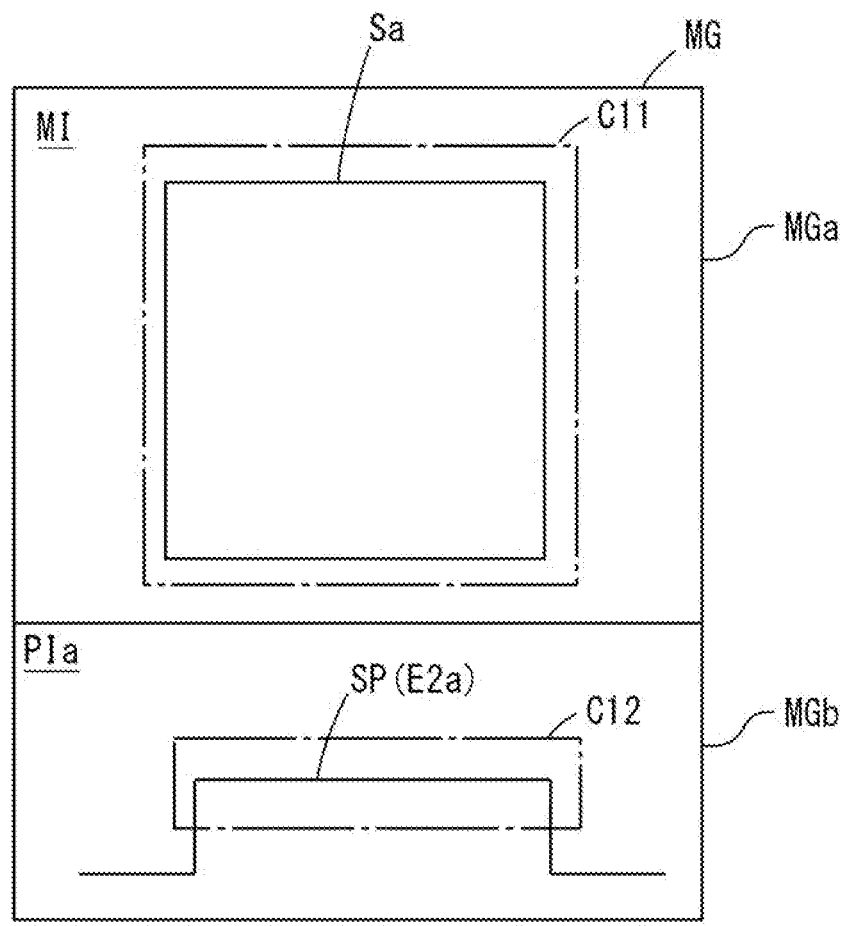
FIG. 27 is a diagram showing an example of a mask setting screen.

In the mask setting, it is possible to set a range set as a target of masking (disabling) in a light receiving amount distribution of the light receiving section 2. In this example, when a mask setting button MB is operated on the setting screen SG shown in FIG. 23, a mask setting screen for performing the mask setting is displayed. FIG. 27 is a diagram showing an example of the mask setting screen. A mask setting screen MG shown in FIG. 27 includes a region designation section MGa and a height range designation section MGb. The reference image MI is displayed on the region designation section MGa on the basis of reference image data. The reference image MI of the reference object Sa corresponding to the measuring object S shown in FIG. 25 is displayed in the region designation section MGa shown in FIG. 27. A designation frame C11 is displayed in the region designation section MGa.

A profile superimposed image PIa is displayed in the height range designation section MGb on the basis of reference height image data. The profile superimposed image PIa shows a plurality of profiles parallel to one another in a superimposed state. For example, profiles on a surface parallel to the X axis and the Z axis are generated at predetermined intervals in the direction of the Y axis. The profiles are superimpose and shown. A designation frame C12 is displayed on the profile superimposed image PIa.

In the example shown in FIG. 27, a line segment SP in the profile superimposed image PIa corresponds to the upper surface E2a of the non-transmission member E2. That is, the reference height image data includes height data of the upper surface of the non-transmission member E2 rather than height data of the upper surface of the transmission member E1. The user can adjust the positions and the sizes of the designation frames C11 and C12 by operating the operation unit 230 shown in FIG. 1. The left and right positions and the left-right width of the designation frame C11 correspond to the left and right positions and the left-right width of the designation frame C12. When the designation frame C11 is moved to the left and the right, the designation frame C12 is also moved to the left and the right according to the movement. When the left-right width of the designation frame C11 is changed, the left-right width of the designation frame C12 is also changed according to the change. Similarly, when the left and right positions and the left-right width of the designation frame C12 are changed, the left and right positions and the left-right width of the designation frame C11 are changed according to the change.

A region in the designation frame C11 is set as a mask target region. A range of the height in the designation frame C12 is set as a mask target height range. The mask target region represents pixels serving as a target of a mask. The mask height target range represents a range of a light receiving amount distribution serving as a target of a mask. In the example shown in FIG. 27, the entire reference object Sa is included in the mask target region. The height of the upper surface E2a of the non-transmission member E2 is included in the mask target height range.

When the mask setting is performed, in the following measurement, in the pixels corresponding to the mask height target range, a peak of a light receiving amount corresponding to the mask height target range is invalidated. In the example shown in FIG. 27, a peak of a light receiving amount corresponding to the upper surface E2a of the non-transmission member E2 is invalidated. For that reason, height data indicating the upper surface E2a of the non-transmission member E2 is not generated. On the other hand, in the pixels corresponding to the mask target region, if a peak of a light receiving amount not corresponding to the mask height target range is present, height data is generated on the basis of the position of the peak. Therefore, in the example shown in FIG. 27, height data indicating the height of the upper surface E1a of the transmission member E1 is generated on the basis of the position of a peak appearing with reflected light on the upper surface E1a of the transmission member E1. In this way, it is possible to acquire height data of a desired part of the measuring object S according to the mask setting. Therefore, it is possible to perform measurement of the desired part on the basis of the generated height image data.

In this way, since the setting concerning the operation of the measurement head 100 is possible, it is possible to adjust generation conditions for measurement height image data according to the measuring object S. Therefore, it is possible to appropriately acquire measurement values of various measuring objects S.

(10) Effects of this Embodiment

In the shape measuring device 300 according to this embodiment, height information of the first region of the measuring object S corresponding to the plurality of pixels of the light receiving section 2 is calculated on the basis of a relative position of the movable section 141 with respect to the supporting section 125 detected by the position detecting section 14 and light receiving amounts of the pixels of the light receiving section 2. In this case, since the plurality of pixels of the light receiving section 2 are two-dimensionally arrayed, it is possible to simultaneously acquire height information of a region in two dimensions. Therefore, it is possible to generate, at high speed, measurement height image data representing the height image of the first region of the measuring object S as the measurement height image.

The measurement luminance image data representing the luminance image of the first region of the measuring object S as the measurement luminance image is generated. The reference luminance image data representing the luminance image of the second region of the reference object Sa, which corresponds to the measuring object S, as the reference luminance image is stored in advance. The reference target region is set in the reference luminance image. The measurement target region corresponding to the reference target region is specified on the measurement height image.

In this case, the measurement target region in the measurement height image is specified on the basis of the relative positional relation between the first region in the measurement luminance image and the second region in the reference luminance image. Therefore, even if the first region of the measuring object S does not have a characteristic height distribution, it is possible to appropriately specify the measurement target region in the measurement height image. Consequently, it is possible to quickly and accurately acquire a measurement value of a desired part of the measuring object S.

In this embodiment, the measurement luminance image data is generated on the basis of the light receiving amounts of the plurality of pixels of the light receiving section 2. Consequently, it is possible to generate both of the measurement height image data and the measurement luminance image data with a simple configuration.

In this embodiment, it is determined whether the calculated measurement value is within the allowable range decided in advance. In this case, it is possible to quickly and accurately determine whether the measurement value is within the allowable range. Therefore, it is possible to effectively use the shape measuring device in an inspection process in a production line of a factory or the like.

In this embodiment, the reference height image data including the height information of the second region of the reference object Sa and representing the height image of the second region as the reference height image is stored in advance. The measurement target region in the measurement height image is specified on the basis of one of the relative positional relation between the first region in the measurement luminance image and the second region in the reference luminance image and the relative positional relation between the first region in the measurement height image and the second region in the reference height image.

Consequently, when the first region of the measuring object S has a characteristic height distribution, it is possible to easily specify the measurement target region in the measurement height image on the basis of the relative positional relation between the first region in the measurement height image and the second region in the reference height image. On the other hand, when the first region of the measuring object has a characteristic luminance distribution, it is possible to easily specify the measurement target region in the measurement height image on the basis of the relative positional relation between the first region in the measurement luminance image and the second region in the reference luminance image.

In this embodiment, the position correction amount A representing the relative positional relation between the search region in the reference height image and the characteristic region in the measurement height image is calculated. The position correction amount B representing the relative positional relation between the search region in the reference luminance image and the characteristic region in the measurement luminance image is calculated. The measurement target region in the measurement height image is specified on the basis of one position correction amount of the calculated position correction amounts A and B. Consequently, it is possible to appropriately specify the measurement target region in the measurement height image.

(11) Other Embodiments

In the embodiment, the height image data and the luminance image data are respectively generated using the common light receiving section 2. However, the height image data and the luminance image data may be generated using different two light receiving sections. In this case, the two light receiving sections are desirably provided to receive the reflected lights from the measuring object S and the reference object Sa under the same conditions.

In the embodiment, the double pattern search is performed on the measurement height image data and the measurement luminance image data. However, only the pattern search for the measurement luminance image data may be performed. In this case, it is possible to specify the measurement target region in the measurement height image on the basis of the distribution of the luminance on the surface of the measuring object S. Note that, when the pattern search for the measurement height image data is not performed, the reference height image does not have to be acquired and stored.

In the embodiment, the setting of the search conditions and the measurement conditions is performed using the reference image data. The measurement value of the measuring object S is calculated on the basis of the setting. However, the setting of the measurement conditions may be performed using the measurement image data. The measurement value of the measuring object S may be calculated under the set conditions. In this case, it is possible to easily acquire the measurement value of the measuring object S without preparing the reference image data.

In the embodiment, the measuring unit 130 is configured such that the optical path length of the measurement light L1 changes and the optical path length of the reference light L2 does not change. However, the present invention is not limited to this. The measuring unit 130 may be configured such that the optical path length of the reference light L2 changes and the optical path length of the measurement light L1 does not change. In this case, the mirror 10 is configured to vibrate relatively to the beam splitter 12 along a traveling direction of the reference light L2.

(12) Correspondence Relation Between the Constituent Elements of Claims and the Sections of the Embodiment An example of correspondence of the constituent elements of claims and the sections and the sections of the embodiment is explained below. However, the present invention is not limited by the example explained below.

In the embodiment, the measuring object S is an example of the measuring object. The reference object Sa is an example of the reference object. The shape measuring device 300 is an example of the shape measuring device. The light projecting section 1 is an example of the light projecting section. The mirror 10 is an example of the reference body. The light receiving section 2 is an example of the light receiving section. The measurement light L1 is an example of the measurement light. The reference light L2 is an example of the reference light. The interference light L3 is an example of the interference light. The beam splitter 12 is an example of the optical system.

The movable section 141 is an example of the movable section. The supporting section 125 is an example of the supporting section. The position detecting section 14 is an example of the position detecting section. The height-image generating section 21 is an example of the image generating section. The luminance-image generating section 22 is an example of the luminance-image generating section. The storing section 220 is an example of the storing section. The setting section 31 is an example of the setting section. The specifying section 32 is an example of the specifying section. The calculating section 33 is an example of the calculating section. The range setting section 34 is an example of the range setting section. The determining section 35 is an example of the determining section. The region designating section 36 is an example of the region designating section. The first detecting section 37 is an example of the first detecting section. The second detecting section 38 is an example of the second detecting section. The measurement-condition receiving section 39 is an example of the measurement-condition receiving section. The generation-condition receiving section 40 is an example of the generation-condition receiving section.

As the constituent elements of claims, other various elements having the configurations or the functions described in claims can also be used.

The present invention can be effectively used for shape measurement of a measuring object.

What is claimed is:

1. A shape measuring device that measures a surface shape of a measuring object, the shape measuring device comprising:
   a light source configured to emit light having a plurality of peak wavelengths;
   a reference body;
   a light receiver including a two-dimensionally arrayed plurality of pixels;
   an optical system configured to guide the light emitted by the light source to the measuring object as measurement light, guide the light emitted by the light source to the reference body as reference light, generate interference light of the measurement light reflected by the measuring object and the reference light reflected by the reference body, and guide the generated interference light to the light receiver;
   a movable section to which at least one of the optical system and the reference body is attached, the movable section moves in a back and forth motion to thereby change a difference between an optical path length of the measurement light and an optical path length of the reference light;
   a supporting section movably supporting the movable section;
   a position detecting section configured to detect relative positions of the movable section with respect to the supporting section;
   a height-image generating section configured to generate, on the basis of the relative positions detected by the position detecting section and light receiving amounts of the generated interference light received by the plurality of pixels of the light receiver, measurement height image data including height information of a first region of the measuring object, which corresponds to the plurality of pixels, and representing a height image of the first region as a measurement height image;
   a luminance-image generating section configured to generate, on the basis of the light receiving amounts of the generated interference light received by the plurality of pixels of the light receiver, measurement luminance image data representing a luminance image of the first region of the measuring object as a measurement luminance image;
   a storing section configured to store reference luminance image data representing a luminance image of a second region of a reference object corresponding to the measuring object as a reference luminance image;
   a setting section configured to set a reference target region in the reference luminance image in response to a user input;
   a specifying section configured to determine a relative positional relation between the first region in the measurement luminance image and the second region in the reference luminance image in accordance with a coincidence between at least part of the first region in the measurement luminance image and at least part of the second region in the reference luminance image, and configured to specify, on the basis of the relative positional relation between the first region in the measurement luminance image and the second region in the reference luminance image, a measurement target region corresponding to the reference target region in the measurement height image; and a calculating section configured to calculate, on the basis of measurement height image data in the measurement target region, a measurement value concerning height of the measuring object in the measurement target region.

2. The shape measuring device according to claim 1, wherein the luminance-image generating section generates the measurement luminance image data on the basis of the light receiving amounts of the plurality of pixels of the light receiver.

3. The shape measuring device according to claim 1, further comprising:
a range setting section configured to set an allowable range of the measurement value; and
a determining section configured to determine whether the measurement value calculated by the calculating section is within the allowable range set by the range setting section.

4. The shape measuring device according to claim 1, wherein
the storing section further stores reference height image data including height information of the second region of the reference object and representing a height image of the second region as a reference height image, and
the specifying section is further configured to determine a relative positional relation between the first region in the measurement height image and the second region in the reference height image in accordance with a coincidence between at least part of the first region in the measurement height image and at least part of the second region in the reference height image, and
the specifying section selects one relation positional relation from the relative positional relation between the first region in the measurement luminance image and the second region in the reference luminance image and the relative positional relation between the first region in the measurement height image and the second region in the reference height image, and specifies the measurement target region in the measurement height image on the basis of the one positional relation.

5. The shape measuring device according to claim 4, further comprising:
a region designating section configured to set a search height region in the reference height image and set a search luminance region in the reference luminance image;
a first detecting section configured to detect a corresponding height region corresponding to the search height region from the measurement height image; and
a second detecting section configured to detect a corresponding luminance region corresponding to the search luminance region from the measurement luminance image, wherein
the specifying section generates first correction information representing a relative positional relation between the search height region in the reference height image and the corresponding height region in the measurement height image, generates second correction information representing a relative positional relation between the search luminance region in the reference luminance image and the corresponding luminance region in the measurement luminance image, selects one correction information of the generated first and second correction information, and specifies the measurement target region in the measurement height image on the basis of the selected correction information.

6. The shape measuring device according to claim 1, further comprising a measurement-condition receiving section configured to receive setting of a measurement condition in the measurement target region, wherein
the calculating section calculates the measurement value on the basis of the measurement condition set by a condition setting section.

7. The shape measuring device according to claim 1, further comprising a generation-condition receiving section configured to receive setting of a generation condition of the measurement height image data, wherein
the height-image generating section generates the measurement height image data on the basis of the generation condition set by a generation-condition setting section.

8. A method for measuring a surface shape of a measuring object, the method comprising:
obtaining a height image of a second first region of a reference object and a luminance image of the second region of the reference object;
storing the height image in the second region of the reference object as a reference height image and the luminance image in the second region as a reference luminance image;
setting a reference target region in the reference height image and the reference luminance image in response to a user input;
obtaining a height image of a first region of a measuring object as a measurement height image and a luminance image of the first region of the measuring object as a measuring luminance image;
searching a first characteristic region corresponding to the reference height image from the measurement height image in accordance with a coincidence between at least part of the first region in the measurement height image and at least part of the second region in the reference height image and a second characteristic region corresponding to the reference luminance image from the measuring luminance image in accordance with a coincidence between at least part of the first region in the measurement luminance image and at least part of the second region in the reference luminance image;
selecting one relation positional relation from the relative positional relation between the first region in the measurement luminance image and the second region in the reference luminance image and the relative positional relation between the first region in the measurement height image and the second region in the reference height image on the basis of a first correlation value between the first characteristic region and the reference height image and a second correlation value between the second characteristic region and the reference luminance image;
specifying a measurement target region, in the measurement height image, corresponding to the reference target region on the basis of the one relation positional relation; and
calculating a measurement value concerning height of the measuring object in the measurement target region of the measurement height image on the basis of the measurement height image.

* * * * *